United States Patent Office 3,828,034
Patented Aug. 6, 1974

3,828,034
TRICYCLIC PHARMACOLOGICAL AGENTS, INTERMEDIATES AND METHODS OF MAKING
Michael Marx, Sunnyvale, and John A. Edwards, Los Altos, Calif., assignors to Syntex (U.S.A.) Inc.
No Drawing. Filed May 25, 1972, Ser. No. 256,751
Int. Cl. C07c 87/02; C09b 23/00
U.S. Cl. 260—240 TC     34 Claims

ABSTRACT OF THE DISCLOSURE 5-(3-Substituted-prop - 1 - enylidene)- and 5-(3-substituted-prop-1-ynyl)- derivatives of 5H-dibenzo[a,d]cycloheptenes and 10,11-dihydro - 5H - dibenzo[a,d]cycloheptenes and methods of making. The process of preparing the 5-(3'-substituted-prop-1-enylidene)- derivatives comprises reaction of the appropriate 5-(3-substituted-prop-1-ynyl)- derivative with a suitable base. The 5-(3-amino substituted - prop-1-enylidene)- derivatives exhibit antihistamine activity and are further useful in the treatment of, and/or palliation of, abnormal conditions, occurring in mammals, related to the central nervous system. The remaining compounds have utility as intermediates for pharmacologically active compounds.

BACKGROUND OF THE INVENTION

1. Field of the Invention

This invention relates to 5-(3-substituted-propyl-1-enylilene)- and 5-(3-substituted-prop-1-ynyl)- derivatives of 5H-dibenzo[a,d]cycloheptenes and 10,11-dihydro-5H-dibenzo[a,d]cycloheptenes and to methods of preparing such derivatives. In a further aspect, this invention relates to 5-(3-substituted-aminoprop-1-enylidene)- derivatives of 5H-dibenzo[a,d]cycloheptenes and 10,11-dihydro-5H-dibenzo[a,d]cycloheptenes, and to methods of preparing such derivatives. In a still further aspect, this invention relates to 5-(3-hydroxyprop-1-enylidene)- derivatives of 5H-dibenzo[a,d]cycloheptenes and 10,11-dihydro-5H-dibenzo[a,d]cycloheptenes and ethers and alkylsulfonyl esters thereof and 5-(3-hydroxyprop-1-ynyl)- derivatives of 5H-dibenzo[a,d]cycloheptene and 10,11-dihydro-5H-dibenzo[a,d]cycloheptene and ethers and alkylsulfonyl esters thereof and to methods of preparing such derivatives, ethers and alkylsulfonyl esters. This invention also relates to methods of preparing 5-(3-substituted amino-prop-1-ynyl)- derivatives of 5H-dibenzo[a,d]cycloheptenes and 10,11-dihydro - 5H - dibenzo[a,d]cycloheptenes.

2. The Prior Art

Within the past fifteen years, significant advances have occurred within the field of chemotherapy, especially with respect to the treatment of mental depression. One family of compounds, which have been found to be particularly useful in the treatment of endogeneous depression (also referred to as melancholic or involution depression) is the family comprising dibenzazepine and dibenzocycloheptene compounds. These compounds are characterized by two benzene rings joined together by a fused cycloheptane ring. The cycloheptane ring frequently contains at least one hetero constituent such as, for example, nitrogen in the dibenzazepines, and can optionally contain a double bond in the 2-carbon atom bridge linking the two benzene rings. A further discussion of this family of compounds, including their chemotherapeutic usefulness in the treatment of mental depression can be had by reference to the literature of the prior art such as, for example, Biel, J., "Chemopharmacologic Approaches to Mental Depression," *Drugs Affecting the Nervous System*, Edit., Burger, Vol. 2, pages 85–125, Marcel Dekker Corp., New York (1968); and Dale, J., "Some Rationales for the Development of Anti-Depressant Drugs," *Molecular Modification on Drug Design*, Advances in Chemistry Series, 45, pages 114–139, 129–136, American Chemical Society, Washington, D.C. (1964); and Klerman and Cole, "Clinical Pharmacolgy of Imipramine and Related Anti-Depressant Compounds," *Pharmacological Reviews*, Vol. 17, No. 2, pages 101–141 (1965).

The tricyclic anti-depressants, e.g. imipramine, amitriptyline, etc., have been found to possess the advantage that they exhibit strong anti-depressant activity in subjects suffering from endogeneous depression, yet exhibit either no activity or only very mild sedative activity in normal subjects. This is particularly important because of the difficulty of clinically distinguishing true endogeneous depressive patients from patients who are merely suffering a momentary period of depression. A further and major problem compounding the difficulty of treating endogeneous depression is that endogeneous depression is seldom a pure depression phenomenon. Typically, there is a dominated anxiety syndrome which can be released by palliation of the depression component. Thus, pure treatment of the depression component frequently results in replacement of the dominant depression manifestation with manifestation of agitation, hostility, belligerency or other undesirable anxieties. This problem is so typically encountered that anti-depressants such as imipramine are now frequently prescribed in combination with a tranquilizer. Therefore, it has become well recognized that an optimum agent for treating endogeneous depression should possess not only strong anti-depressant properties selective to subjects suffering from endogeneous depression as contrasted to normal subjects, but should also have the seemingly antithetical property of having moderate tranquilizing or sedative properties. Accordingly, we have now discovered compounds having the desired combination of anti-depressant and tranquilizing properties and which can be properly classified as true tranquilizing anti-depressants. In addition, we have discovered compounds having potent anti-depressant activities with insignificant or no tranquilizing activities, which can be classified as pure anti-depressants, and also compounds having potent tranquilizing activities with little or no anti-depressant activities, which can be classified as pure tranquilizers. The compounds further exhibit potent antihistamine properties and thus can also be used as antihistamines.

SUMMARY OF THE INVENTION

In summary the compounds of our invention can be represented by the following generic formula:

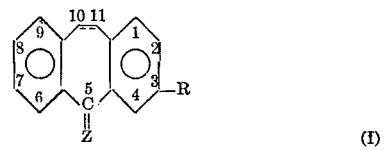

(I)

wherein the dotted line indicates either a saturated (ethylene) bridge or an unsaturated double bond (vinyl) bridge between the C–10 and C–11 carbon atoms;

R is hydrogen, lower alkyl, lower alkoxy, lower alkenyl, trifluoromethyl, alkylsulfonoyl, trifluoromethylsulfonyl, thioalkyl, dialkylsulfamoyl, or cyano;

Z is a group having the formulas

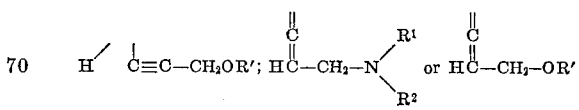

wherein
- —OR′ is hydroxy, labile ether group or the group —OSO₂R₂′ wherein R₂′ is lower alkyl; and
- R¹ and R² are independently hydrogen, lower alkyl, lower cycloalkyl, phenylalkyl, phenacyl or substituted phenacyl; R¹ and R² together with the nitrogen atom to which they are joined form a heterocyclic ring having from 5 through 7 ring atoms having from 1 or 2 hetero atoms selected from the group consisting of nitrogen, sulfur and oxygen, wherein one of said hetero atoms is the joining nitrogen atom, or R¹ and R² together with the nitrogen atom to which they are joined form a substituted nitrogen heterocyclic ring.

Also encompassed within our invention are pharmaceutically acceptable salts of the compounds of formula I.

In summary one process of our invention can be represented by the following schematic overall reaction equation:

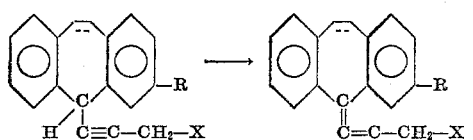

wherein X is the group

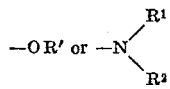

and wherein

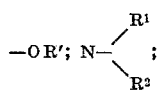

R and the dotted line are as defined hereinabove.

In summary, another process of the invention comprises converting the compounds of formula Is, wherein X is —OR to the corresponding compounds of formula Is, wherein X is

The invention will be further described herein below.

FURTHER DESCRIPTION OF THE INVENTION AND PREFERRED EMBODIMENTS

The compounds of our invention can be represented by the following sub-generic formulas:

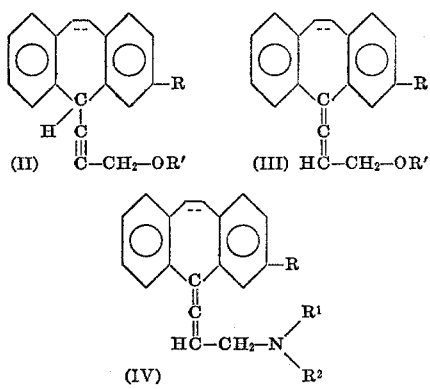

wherein the dotted line indicates either a saturated (ethylene) bridge or an unsaturated double bond (vinyl) bridge between the C-10 and C-11 carbon atoms;

R is hydrogen, lower alkyl, lower alkoxy, lower alkenyl, halo, trifluoromethyl, alkylsulfonyl, trifluoromethylsulfonyl, thioalkyl, dialkylsulfamoyl, cyano;

R¹ and R² are independently hydrogen, lower alkyl, lower cycloalkyl, phenylalkyl, hydroxyalkoxyalkyl, phenacyl or substituted phenacyl; or R¹ and R² together with the nitrogen atom to which they are joined form a nitrogen heterocyclic ring having from 5 through 7 ring atoms and wherein in addition to said joining nitrogen atom, said heterocyclic ring can have one additional hetero ring atom selected from the group of nitrogen, sulfur, and oxygen, or R¹ and R² together with the nitrogen atom to which they are joined form a substituted heterocyclic ring having the formula:

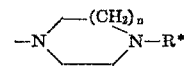

wherein
- n is 1 or 2 and R* is H, lower alkyl, or hydroxyalkyl; and
- —OR′ is hydroxy, acid labile ether or the group —OSO₂R₂′ wherein R₂′ is lower alkyl.

Also encompassed within our invention are pharmaceutically acceptable salts of the compounds of formula IV.

As used herein above and below the following terms have the following meanings unless expressly stated to the contrary. The term lower alkyl refers to both straight and branched chain alkyl groups having a total of from 1 through 6 carbon atoms and thus includes primary, secondary and tertiary alkyl groups. Typical lower alkyls include, for example, methyl, ethyl, n-propyl, isopropyl, n-butyl, t-butyl, n-hexyl and the like. The term cycloalkyl refers to cyclic hydrocarbon groups having from 3 through 7 carbon atoms such as, for example, cyclopropyl, cyclopentyl, cycloheptyl, and the like. The term haloalkyl refers to such groups having from one through four carbon atoms and from one through four halo atoms. Typical haloalkyl groups include, for example, trifluoromethyl, 1,2,2,2-tetrachloroethyl and the like. The term lower alkenyl refers to monoethylenically unsaturated aliphatic groups having from 2 through 6 carbon atoms and wherein the double bond can be between any two adjacent carbon atoms. Typical lower alkenyl groups include, for example, vinyl, propenyl, and the like. The term alkoxy refers to the group having the formula R′O— wherein R′ is lower alkyl. Typical alkoxy groups include, for example, methoxy, ethoxy, t-butoxy and the like. The term (lower alkoxy) lower alkyl refers to the group —R′—OR′ wherein R′ is lower alkyl and OR′ is lower alkoxy. The term hydroxy lower alkyl refers to groups having the formula HOR′— wherein R′ is lower alkyl. Typical hydroxyalkyl groups include, for example, hydroxymethyl, α-hydroxyethyl, β-hydroxypropyl, hydroxyisopropyl, hydroxy-t-butyl and the like. The term hydroxyalkoxyalkyl refers to the group having the formula —R′—OR″—OH wherein R′ and R″ are the same or different lower alkyls. Typical hydroxyalkoxyalkyl groups thus include, for example, hydroxymethoxymethyl, β-(β-hydroxyethyl)-ethyl and the like. The term acid labile ether refers to ether groups which can be removed by mild acid hydrolysis from the parent moiety to which they are attached. Typical acid labile ether groups include, for example, methoxymethoxy; 1′-methoxyethoxy; 1′-ethoxyethoxy; phenoxymethoxy; 2′-methoxyprop-2′-oxy; tetrahydropyranyl-2′-oxy; tetrahydrofuran-2′-oxy; 2′-butoxyprop-2′-oxy; 1′-pent-1″-oxycyclohexyl-1′-oxy; and the like.

The term phenylalkyl refers to a phenyl substituted alkyl group such as benzyl, phenylethyl, o-, m-, or p-methylbenzyl, and the like, preferably having up to ten carbons. The term substituted phenyl refers to phenyl groups substituted at one or more of the ortho, meta or para positions with a hydroxy, lower alkyl, acyloxy, lower alkoxy or halo groups. Typical substituted phenyl groups include, for example, p-hydroxyphenyl, p-tolyl, p-acetoxyphenyl, p-nitrophenyl, p-fluorophenyl, p-chlorophenyl and the corresponding ortho and meta isomers. The term substituted phenacyl refers to the group having the formula $$-CH_2-\overset{O}{\underset{\|}{C}}-\underset{Y}{\underset{|}{\bigcirc}}$$

wherein Y is hydrogen, halo, halo alkyl having from one through four carbon atoms and from one through four halo atoms, lower alkyl, or lower alkoxy, and Y can be at any position on the phenyl rings.

The term lower alkylamino refers to the group having the formula R'HN— wherein R' is lower alkyl. The term dialkylamino refers to the group R'R''N— wherein R' and R'' are the same or different lower alkyls.

The term thioalkyl refers to groups having the formula R'S— wherein R' is lower alkyl. The term alkylsulfonyl refers to groups having the formula $$R'\overset{O}{\underset{\|}{\underset{\|}{S}}}-$$
$$\overset{\|}{O}$$

wherein R' is lower alkyl. The term sulfamoyl refers to the groups having the formula $$H_2N-\overset{O}{\underset{\|}{\underset{\|}{S}}}-,$$
$$\overset{\|}{O}$$

The term alkylsulfamoyl refers to groups having the formula $$R'HN-\overset{O}{\underset{\|}{\underset{\|}{S}}}-$$
$$\overset{\|}{O}$$

wherein R' is lower alkyl. The term dialkylsulfamoyl refers to groups having the formula $$R_1'R_2'N-\overset{O}{\underset{\|}{\underset{\|}{S}}}$$
$$\overset{\|}{O}$$

wherein $R_1'$ and $R_2'$ are lower alkyl. Typical dialkylsulfamoyls include, for example, dimethylsulfamoyl, N-isopropyl-N-methylsulfamoyl, N-ethyl-N-methylsulfamoyl and the like.

The term N-heterocycle refers to both saturated and unsaturated heterocycles having from five through seven ring atoms, one of which is nitrogen and which can optionally also contain a second hetero element ring atom selected from the group of nitrogen, sulfur and oxygen. Also, encompassed within the term are substituted N-heterocyclics having one or two substituents independently selected from the group of lower alkyl, hydroxylower alkyl, and halo. Typical N-heterocycles thus include, for example, those groups having the formulas:

and the like.

The term pharmaceutically acceptable salts refers to pharmaceutically acceptable acid addition salts which do not adversely affect the pharmaceutical properties of the parent compounds. With respect to the addition salts, suitable inorganic anions include, for example, chloride, bromide, iodide, sulfate, phosphate, nitrate, and the like. Suitable organic anions include, for example, lactate, picrate, tartrate, maleate, fumarate, citrate, succinate, toluenesulfonate, ascorbate, pamoate, nicotinate, adipate, glyconate and the like.

All temperatures and temperature ranges refer to the Centigrade scale and the term ambient or room temperature refers to about 20° C.

The abbreviations CNS refers to the central nervous system.

Typical illustrations of the compounds of formula IV, of our invention, can be had, for example, by reference herein below to Examples 7, 8, 9 and 10.

With respect to the compounds of formula IV, the preferred R substituents are hydrogen, chloro, cyano, trifluoromethyl and N,N-dimethylsulfamoyl.

With respect to the compounds of formula IV, the preferred $R^1$ and $R^2$ substituents are those wherein one of $R^1$ or $R^2$ is methyl and the other is selected from the group consisting of hydrogen, methyl and p-chlorophenacyl or wherein $R^1$ and $R^2$ together with the nitrogen atom to which they are joined form a substituted heterocycle selected from the group consisting of N-(N'-methyl)piperazinyl and N-(N'-β-hydroxyethyl)piperazinyl.

The particularly preferred compounds of formula IV having a vinyl bridge between the C-10 and C-11 carbon atoms are:

5-(3-dimethylaminoprop-1-enylidene)-5H-dibenzo[a,d] cycloheptene;
5-(3-methylaminoprop-1-enylidene)-5H-dibenzo[a,d] cycloheptene;
5-(3-[N-methyl-N-(p-chlorophenacyl)]aminoprop-1-enylidene)-5H-dibenzo[a,d]cycloheptene;
5-(3-[N'-(β-hydroxyethyl)N-piperazino]prop-1-enylidene)-5H-dibenzo[a,d]cycloheptene;
3-cyano-5-(3-dimethylaminoprop-1-enylidene)-5H-dibenzo[a,d]cycloheptene;
5-(3-dimethylaminoprop-1-enylidene)-3-trifluoromethyl-5H-dibenzo[a,d] cycloheptene;
5-(3-dimethylaminoprop-1-enylidene)-3-dimethylsulfamoyl-5H-dibenzo[a,d]cycloheptene;
5-(3-[N'-(β-hydroxyethyl)N-piperazino]-3-trifluoromethyl-prop-1-enylidene)-5H-dibenzo[a,d]cycloheptene;
3-cyano-5-(3-[N'-methyl-N-piperazino]prop-1-enylidene)-5H-dibenzo[a,d]cycloheptene;
3-chloro-5-(3-dimethylaminoprop-1-enylidene)-5H-dibenzo[a,d]cycloheptene;

and the corresponding pharmaceutically acceptable salts thereof.

The particularly preferred compounds of formula IV having a saturated (ethylene) bridge between the C-10 and C-11 carbon atoms are:

10,11-dihydro-5-(3-dimethylaminoprop-1-enylidene)-5H-dibenzo[a,d] cycloheptene;
10,11-dihydro-5-(3-methylaminoprop-1-enylidene)-5H-dibenzo[a,d] cycloheptene;
10,11-dihydro-5-(3-[N'-methyl-N-(p-chlorophenacyl)]aminoprop-1-enylidene)-5H-dibenzo[a,d]cycloheptene;
10,11-dihydro-5-(3-[N'-(β-hydroxyethyl)N-piperazino]prop-1-enylidene)-5H-dibenzo[a,d]cycloheptene;
3-cyano-10,11-dihydro-5-(3-dimethylaminoprop-1-enylidene)-5H-dibenzo[a,d]cycloheptene;
10,11-dihydro-5-(3-dimethylaminoprop-1-enylidene)-3-trifluoromethyl-5H-dibenzo[a,d]cycloheptene;

10,11-dihydro-5-(3-dimethylaminoprop-1-enylidene)-3-dimethylsulfamoyl-5H-dibenzo[a,d]cycloheptene;

10,11-dihydro-5-(3-[N'-(β-hydroxyethyl)N-piperazino]-3-trifluoromethyl-prop-1-enylidene)-5H-dibenzo-[a,d]cycloheptene;

3-cyano-10,11-dihydro-5-(3-[N'-methyl-N-piperazino]prop-1-enylidene)-5H-dibenzo[a,d]cycloheptene;

3-chloro-10,11-dihydro-5-(3-dimethylaminoprop-1-enylidene)-5H-dibenzo[a,d]cycloheptene;

and the corresponding pharmaceutically acceptable salts thereof.

Typical illustrations of the compounds of formulas II and III can be had, for example, herein below by reference to Examples 1, 2 and 3 and Examples 11, 13 and 15, respectively.

Since the primary utility of the compounds of formulas II and III is as intermediates, the preferred R-substituents in the compounds of formulas II and III are the same as those listed above for the preferred compounds of formula IV and the particularly preferred compounds of formulas II and III are the corresponding precursors (or intermediates) of the corresponding particularly preferred compounds of formula IV enumerated herein above.

Considering the particularly preferred compounds of formula IV in terms of particular therapeutic CNS activity, the following compounds and their pharmaceutically acceptable salts exhibit a significant combination of anti-depressant and tranquilizing activities and can be classified as tranquilizing antidepressants:

5-(3-dimethylaminoprop-1-enylidene)-5H-dibenzo[a,d]cycloheptene;

10,11-dihygdro-5-dimethylaminoprop-1-enylidene)-5H-dibenzo[a,d] cycloheptene;

10,11-dihydro-5-(3-[N'-methyl-N-piperazino]prop-1-enylidene)-5H-dibenzo[a,d]cycloheptene;

5-(3-[N'-(β-hydroxyethyl)N-piperazino]prop-1-enylidene)-5H-dibenzo[a,d]cycloheptene;

3-chloro-5-(3-dimethylaminoprop-1-enylidene)-5H-dibenzo[a,d]cycloheptene; and 3-chloro-10,11-dihydro-5-(3-dimethylaminoprop-1-enylidene)-5H-dibenzo[a,d]cycloheptene.

The first of these compounds is particularly notable in that, based on laboratory animal studies, it exhibits an anti-depressant activity of at least four to 16 times that of imipramine and also exhibits a tranquilizing or sedative activity greater than meprobamate or phenobarbital.

The following particularly preferred compounds and their pharmaceutical acceptable salts exhibit potent anti-depressant activity with no, or only insignificant, tranquilizing or sedative activity:

5-(3-methylaminoprop-1-enylidene)-5H-dibenzo[a,d]cycloheptene;

10,11-dihydro-5-(3-methylaminoprop-1-enylidene)-5H-dibenzo[a,d]cycloheptene.

The following particularly preferred compounds and their pharmaceutically acceptable salts exhibit potent tranquilizing or sedative activities with no, or only insignificant, anti-depressant activity:

3-cyano-10,11-dhydro-5-(3-dimethylaminoprop-1-enylidene)-5H-dibenzo[a,d]cycloheptene; and 10,11-dihydro-5-(3-[N'-(β-hydroxyethyl)-N-piperazino]prop-1-enylidene)-5H-dibenzo[a,d]cycloheptene.

The remaining particularly preferred compounds and their pharmaceutically acceptable salts also exhibit potent CNS properties and particularly so 3-cyano-5-(3-dimethylaminoprop-1-enylidene) - 5H - dibenzo[a,d]cycloheptene and its pharmaceutically acceptable salts.

One process of our invention for preparing the compounds of formula IV of our invention can be represented by the following schematic overall reaction equation:

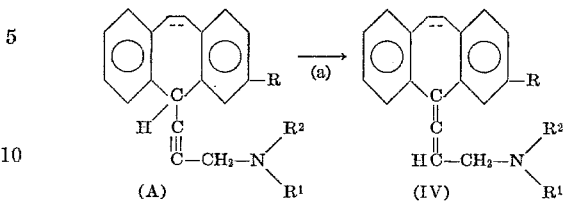

wherein R, R¹, R² and the dotted bond line have the same meaning as set forth herein above.

This reaction (step a) can be effected by treating the corresponding starting material of formula A with a suitable base in a suitable inert organic solvent.

This treatment can be conducted over a wide range of conditions and is conveniently conducted at temperatures in the range of about from 15° ot 25° C. e.g. room temperature). However, the treatment can also be conducted at temperatures in the liquid state range of the particular solvent used (i.e. from near the freezing point to near the boiling point of the solvent system). Correspondingly higher temperatures can be used by the use of pressurized systems. Typical homogeneous base-solvent systems which can be employed include, for example, potassium hydroxide in methanol; lithium methoxide in methanol; benzyltrimethylammonium hydroxide in methano-diethyl ether mixture; and the like. The concentration of base can vary over a wide range depending on the particular base-solvent system but typically will be in the range of about from .005 to 3 Normal. The optimum base-solvent combination will vary with the particular tricyclic starting material (formula A) used, and can be determined by routine trial and error experimentation, well within the scope of those skilled in the art. We have found the benzyltrimethylammonium hydroxide system to be of general applicability. Correspondingly, treatment times can vary over a wide range dependent on the particular starting material of formula A and concentration; the particular base-sovlent system and base concentration and treatment temperature, but typically will be in the range of about from 5 minutes to 24 hours. Optimum conditions can again be obtained by routine experimentation well within the scope of those having ordinary skill in the art.

Alternatively, a heterogeneous base-solvent system such as, for example, basic alumina or a basic ion exchange resin in a suitable solvent such as, for example, diethyl ether, can be employed. Where a heterogeneous system is employed, it is preferred that the starting material (formula A) does not contain free hydroxyl, primary amine or secondary amine substituents. The heterogeneous base treatment can be effected over a wide range of time and temperatures, although it is conveniently conducted at temperatures in the range of about from 15° to 25° C. for about from five minutes to 24 hours. Typically a reactant ratio in the range of about from 1 to 20 parts, by weight, of solid base (e.g. alkaline alumina) per part of tricyclic starting material is employed. Again optimum conditions can be determined by routine experimentation. For example, optimum conditions for any gievn homogeneous or heterogeneous system can be conveniently determined by following the progress of the reaction by thin-layer chromatography and varying the appropriate conditions of temperatures and base strength to effect the desired isomerization in a convenient period of time.

The resulting product of formula IV can then be separated and further purified by any suitable procedure such as, for example, via crystallization of an acid salt and/or by chromatography. Typically illustrations of specific separation and purification procedures can be had by reference to the approiate examples set forth herein below.

The starting materials of formula A can be prepared according to the procedure described in U.S. Pat. 3,309,-

404, or can be prepared according to the following process, of the invention, which can be conveniently schematically represented by the following sequence of overall reaction equations:

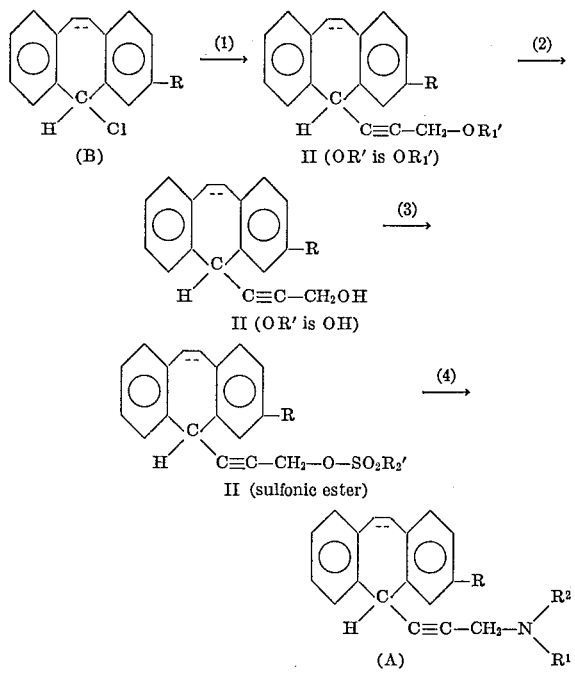

wherein $OR_1'$ is a labile ether; $R_2'$ is lower alkyl (preferably methyl); and R is as defined herein above.

Step 1 of the above process can be conveniently effected by treating the compound of formula B, in a suitable inert organic solvent, with a suitable propyne ether organo-metallic reagent. Typically, this treatment is conducted at temperatures in the range of about from 20° to 85° C., preferably about from 40° to 70° C., for about from ½ to 18 hours, and preferably about from 1 to 4 hours. Typically, a mole ratio in the range of about from 1 to 1.5 moles of organo-metallic reagent is used per mole of compound of formula B. Preferably, the treatment is conducted under anhydrous conditions and under an inert atmosphere (e.g. nitrogen). Suitable inert organic solvents which can be used include, for example, tetrahydrofuran, tetrahydropyran, and the like. Suitable propynyl ether organo-metallic reagents which can be used include those reagents which function in a similar manner as classic Grignard Reagents and include, for example, 3-(2-tetrahydropyranyloxy)-prop-1-ynyl-magnesium chloride;
3-(2-tetrahydropyranyloxy)-prop-1-ynyl-lithium;
3-(1-methoxycyclohexyloxy)-prop-1-ynyl-1-magnesium chloride;

and the like. The organo-metallic reagents, used in the practice of the above process, can be prepared according to known procedures such as, for example, described by Edwards et al., *J. Med. Chem.*, vol. 14, 1190 (1971) and by Landor et al. in *J. Chem. Soc.*, page 185 (1967) or in Preparation 3, described hereinbelow, or by obvious modifications of such procedures. The starting materials of formula B can be prepared according to known procedures such as, for example, described by G. Berti in *Gazz. Chim. Ital.*, v. 87, 293–309 (1957), or according to the procedure described herein below in Preparation 2, or by obvious modifications of such procedures.

In step 2 of our process the ether moiety is cleaved by hydrolysis to yield the corresponding hydroxy substituent. This can be conveniently effected by treatment with an aqueous acid solution in an organic solvent according to conventional hydrolysis procedures. For example, typical hydrolysis conditions can be found by reference to *Steroid Reactions*, pp. 76–79. Preferably the treatment is monitored by any suitable procedure, conveniently thin-layer chromatography, and the treatment continued until hydrolysis is indicated as substantially complete.

Step 3 of the above process can be conveniently effected by treating the compound of formula II (R' is hydrogen) with an alkyl sulfonyl chloride in an organic solvent containing a small quantity of an organic base, according to the procedure of R. K. Crossland and K. L. Servis, *J. Org. Chem.*, 35, 3195 (1970).

Step 4 can be effected by treating the sulfonic ester intermediate of formula II, of the invention, with the appropriate amine

where $R^1$ and $R^2$ are as previously defined. For example, by treating the compounds of formula IV with dimethylamine, the corresponding compounds of formula A wherein each of $R^1$ and $R^2$ is methyl are obtained. Similarly, treatment with a monoalkylamine will yield the corresponding compound of formula A wherein one of $R^1$ or $R^2$ is the corresponding alkyl group and the other is hydrogen. Correspondingly, using a heterocyclic amine such as, for example, piperidine; pyrrolidine; or morpholine will respectively yield the corresponding piperidinyl, pyrrolidinyl and morpholino derivatives of formula A. Preferably the reaction is conducted in a suitable inert organic solvent. Further, although optimum conditions and solvents will vary according to the particular sulfonate ester of formula II and displacing amine used, the treatment is typically conducted at temperatures in the range of about from 0° to 70° C. for about from ½ to 24 hours. However, temperatures and treatment times both above and below these ranges can also be used. Suitable inert organic solvents which can be used include, for example, methylene chloride, chloroform, methanol, diethyl ether and the like.

The compounds of formulas III and IV, of our invention, can also be prepared according to another process of our invention via the intermediates of formula II. This process can be schematically represented by the following overall reaction equation sequence:

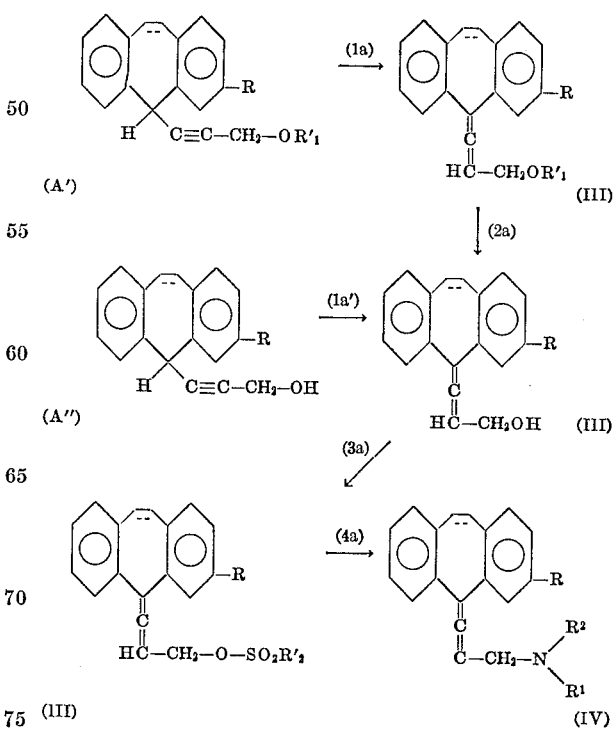

wherein R, R¹, R², R₁' and R₂' are as defined before.

Steps 1a and 1a' can be effected by treating the corresponding starting material of formula A' or A" with a suitable base in a suitable organic solvent. This treatment can be effected according to the same procedures as described herein above on pages 15, 16 and 17 with respect to step (a), the rearrangement of the 5-ethinylamino starting materials of formula A to the corresponding 5-propenylideneamino compounds of formula IV. However, in this instance, where a heterogeneous base system is used, temperatures in the range of about from 0° to 150° C. are typically used, and preferably about from 30° to 85° C., for about from ½ to 36 hours.

Similarly, steps 2a, 3a and 4 can be effected according to the procedures described hereinabove with respect to steps 2, 3 and 4, respectively.

Unless otherwise indicated, it is preferable that the respective products of each step, in each process, are isolated prior to their subsequent use as starting materials for the next succeeding step. Separation and purification can be effected by suitable separation or purification procedures such as, for example, extraction, precipitation, filtration, washing, evaporation, crystallization, column and thin-layer chromatography, etc. Specific illustrations of typical separation and purification procedures can be had by reference to the corresponding Examples set forth hereinbelow. However, other suitable separation and purification procedures could, of course, also be used.

The pharmaceutically acceptable salts, of the invention, can be conveniently prepared by treating the corresponding amine of formula IV with an acid and can also be prepared by other conventional procedures such as, for example, ion exchange.

The compounds and pharmaceutically acceptable salts of formula IV, of our invention, are useful in the treatment and/or palliation of abnormal conditions, occurring in mammals, which are related to the central nervous system—e.g. depression-anxiety. In addition, the compounds and salts are also useful as antihistamines in the treatment of mammals. The compounds and salts can be administered either as solids or liquids. Typically, the compounds and salts are administered in combination with a pharmaceutical carrier in which the active component is dissolved, dispersed or suspended and can optionally contain small amounts of preservatives and/or pH-buffering agents. Suitable preservatives which can be used include, for example, benzyl alcohol and the like. Suitable buffering agents include, for example, sodium acetate and pharmaceutically acceptable phosphate salts and the like.

Suitable liquid compositions can, for example, take the form of solutions, emulsions, suspensions, syrups, elixirs, and the like. Similarly suitable solid compositions can be in the form of tablets, powders, capsules, pills, and the like, preferably in unit dosage form for simple administration or precise dosages. Suitable solid carriers which can be used include, for example, pharmaceutical grades of starch, lactose, sodium saccharin, talcum, and the like.

Where the compounds are being administered for the treatment or palliation of a central nervous system related disorder, the preferred dosage can vary over a wide range depending upon the particular subject and disorder, and severity of the disorder, being treated. Typically, the dosage range from such disorders will be in the range of about from 0.001 to 20 mg. per kg. of body weight, per day. Also, because of the problems incident to the treatment of central nervous system related disorders, close subject observation and control are desirable. Where the compounds are being applied as simple antihistamine, less stringent subject observation and control is generally needed and typically the lower dosage ranges, on the order of about from .001 to 5 mg. per kg. of body weight per day are used.

A further understanding of the invention can be had from the following non-limiting preparations and examples. Also, where needed, preparations and examples are repeated to provide sufficient starting materials for subsequent examples and preparations.

PREPARATION 1

5H-Dibenzo[a,d]Cyclohepten-5-ol

In this preparation a solution containing 1.5 grams of sodium borohydride in 30 ml. of water containing 1.5 ml. of 3N aqueous sodium hydroxide is added to a solution containing 15.0 g. of dibenzo[a,d]cyclohepten-5-one in 200 ml. of methanol at room temperature, with stirring. The resulting mixture is stirred for 45 minutes and then an additional 0.5 g. of borohydride in 10 ml. of water is added and the mixture stirred at room temperature for 60 hours. The reaction mixture is then cooled in an ice water bath while 300 ml. of water is slowly added with stirring. The resulting precipitate is collected by filtration and washed repeatedly with water and dried under vacuum affording a residue of 5H-dibenzo[a,d]cyclohepten-5-ol, which is sufficiently pure to use as starting material for subsequent preparations.

Similarly, by following the same procedure as above but using the corresponding 5-one starting material, the following compounds are respectively prepared:

3-methyl-5H-debenzo[a,d]cyclohepten-5-ol;
3-pentyl-5H-dibenzo[a,d]cyclohepten-5-ol;
3-ethenyl-5H-dibenzo[a,d]cyclohepten-5-ol;
3-fluoro-5H-dibenzo[a,d]cyclohepten-5-ol;
3-chloro-5H-dibenzo[a,d]cyclohepten-5-ol;
3-trifluoromethyl-5H-dibenzo[a,d]cyclohepten-5-ol;
3-methylmercapto-5H-dibenzo[a,d]cyclohepten-5-ol;
3-ethylsulfonyl-5H-dibenzo[a,d]cyclohepten-5-ol;
3-trifluoromethylsulfonyl-5H-dibenzo[a,d]cyclohepten-5-ol;
3-(N,N-dimethylsulfamoyl)-5H-dibenzo[a,d]cyclohepten-5-ol;
3-cyano-5H-dibenzo[a,d]cyclohepten-5-ol;
10,11-dihydro-5H-dibenzo[a,d]cyclohepten-5-ol;
10,11-dihydro-3-methyl-5H-dibenzo[a,d]cyclohepten-5-ol;
10,11-dihydro-3-pentyl-5H-dibenzo[a,d]cyclohepten-5-ol;
10,11-dihydro-3-methoxy-5H-dibenzo[a,d]cyclohepten-5-ol;
10,11-dihydro-3-ethenyl-5H-dibenzo[a,d]cyclohepten-5-ol;
10,11-dihydro-3-fluoro-5H-dibenzo[a,d]cyclohepten-5-ol;
3-chloro-10,11-dihydro-5H-dibenzo[a,d]cyclohepten-5-ol;
10,11-dihydro-3-trifluoromethyl-5H-dibenzo[a,d]cyclohepten-5-ol;
10,11-dihydro-3-methylmercapto-5H-dibenzo[a,d]cyclohepten-5-ol;
10,11-dihydro-3-ethylsulfonyl-5H-dibenzo[a,d]cyclohepten-5-ol;
10,11-dihydro-3-(N,N-dimethylsulfamoyl)-5H-dibenzo[a,d]cyclohepten-5-ol; and
3-cyano-10,11-dihydro-5H-dibenzo[a,d]cyclohepten-5-ol.

PREPARATION 2

5-Chloro-5H-Dibenzo[a,d]Cycloheptene

In this preparation 25 ml. of thionyl chloride is added dropwise, with vigorous stirring, to a slurry of 5 g. of 5H-dibenzo[a,d]cyclohepten - 5 - ol in 50 ml. of anhydrous benzene containing five drops of pyridine, at about 0° C. The resulting mixture is continually stirred and allowed to heat to room temperature and then allowed to stand for four hours. The resulting mixture is then evaporated under vacuum to remove solvent and excess reagent affording a crystalline residue of 5-chloro-5H-dibenzo[a,d]cycloheptene which is then further dried under vacuum.

Similarly, by following the same procedure as above but respectively using the products of Preparation 1 as starting materials, the corresponding 5-chloro derivatives are respectively prepared.

PREPARATION 3

5-(3-N,N-Dimethylaminoprop-1-ynyl)-5H-Dibenzo[a,d]Cycloheptene

In this preparation a solution of 3-dimethylaminoprop-1-ynyl magnesium chloride in 40 ml. of anhydrous tetrahydrofuran is prepared by the dropwise addition of 8.0 ml. of 1-N,N-dimethylamino-2-propyne to a stirred solution, under a nitrogen atmosphere, containing 0.046 moles of vinyl magnesium chloride in 40 ml. of anhydrous tetrahydrofuran. This mixture is heated at 50° C. for one hour and then stirred at room temperature for an additional hour to ensure completion of the reaction. To this solution is added a solution containing 9.88 g. of 5-chloro-10,11-dihydro-5H-dibenzo[a,d]cycloheptene in 75 ml. of anhydrous tetrahydrofuran, at room temperature. The resulting mixture is heated at reflux for two hours, then allowed to cool to room temperature and treated with an excess of saturated aqueous ammonium chloride solution to decompose any excess 3-dimethylaminoprop-1-ynyl magnesium chloride. The mixture is then diluted with about ½ its volume of water and concentrated under vacuum to remove most of the tetrahydrofuran, and then extracted with ethyl ether. The ethereal extracts are combined and shaken several times with 1 Normal aqueous hydrochloric acid. The aqueous acid extracts are combined, then washed with ether and made slightly alkaline by the addition of dilute potassium hydroxide, and then extracted with three portions of ethyl ether. The ethereal extracts are combined and washed consecutively with water and saturated aqueous sodium chloride, and then dried over a mixture of anhydrous potassium carbonate and magnesium sulfate and evaporated under vacuum affording crude 5-(3-N,N-dimethylaminoprop-1-ynyl) - 5H-dibenzo[a,d]cycloheptene, which is then divided into two portions. The first portion is purified by a crystallization as the maleic acid salt via treatment with an ethereal solution of maleic acid.

The second portion of the crude product is purified by column chromatography on silica gel employing hexane-acetone for elution.

Similarly, by following the same procedure as above but respectively using the products of Preparation 2 as starting materials, the corresponding 5-(3-N,N-dimethylaminoprop-1-ynyl)-derivatives are respectively prepared.

PREPARATION 4

This preparation illustrates methods of preparing ring substituted-ω-bromoacetophenones by bromination of the corresponding ring substituted acetophenone.

In this preparation a solution containing 1.76 g. (0.01 moles) of p-t-butylacetophenone in 20 ml. of chloroform is added to a briskly stirred suspension containing 4.47 g. (0.02 moles) of cupric bromide in 20 ml. of refluxing ethyl acetate. The resulting mixture is refluxed and stirred until the black suspended solid (cupric bromide) is observed to have disappeared. The mixture is then cooled to room temperature (i.e. about 20° C.) and then filtered to remove precipitated cuprous bromide. The filtrate is treated with particulate activated charcoal and then filtered to remove the charcoal. The resulting filtrate is evaporated to dryness, under vacuum, affording a residue of p-t-butyl-ω-bromoacetophenone, which is sufficiently pure for use as starting material in the ensuing examples.

Similarly, by following the same procedure using the corresponding ring substituted acetophenones as starting materials, the following compounds are respectively prepared:

p-chloro-ω-bromoacetophenone;
o-chloro-ω-bromoacetophenone;
m-chloro-ω-bromoacetophenone;
p-fluoro-ω-bromoacetophenone;
o-fluoro-ω-bromoacetophenone;
m-fluoro-ω-bromoacetophenone;
p-bromo-ω-bromoacetophenone;
o-bromo-ω-bromoacetophenone;
m-bromo-ω-bromoacetophenone;
p-iodo-ω-bromoacetophenone;
o-iodo-ω-bromoaetophenone;
m-iodo-ω-bromoacetophenone;
p-methyl-ω-bromoacetophenone;
o-methyl-ω-bromoacetophenone;
m-methyl-ω-bromoacetophenone;
p-(t-butyl)-ω-bromoacetophenone;
o-(t-butyl)-ω-bromoacetophenone;
m-(t-butyl)-ω-bromoacetophenone;
p-(n-pentyl)-ω-bromoacetophenone;
o-(n-pentyl)-ω-bromoacetophenone;
m-(n-pentyl)-ω-bromoacetophenone;
p-trifluoromethyl-ω-bromoacetophenone;
o-trifluoromethyl-ω-bromoacetophenone;
m-trifluoromethyl-ω-bromoacetophenone;
p-(1,2,2,2-tetrachloroethyl)-ω-bromoacetophenone;
o-(1,2,2,3-tetrachloroethyl)-ω-bromoacetophenone;
m-(1,2,2,2-tetrachloroethyl)-ω-bromoacetophenone;
p-methoxy-ω-bromoacetophenone;
o-methoxy-ω-bromoacetophenone;
m-methyl-ω-bromoacetophenone;
p-(t-butoxy)-ω-bromoacetophenone;
o-(t-butoxy)-ω-bromoacetonphenone; and
m-(t-butoxy)-ω-bromoacetophenone.

EXAMPLE 1

This example illustrates methods according to step 1 of the process, of our invention, for preparing the compounds of formula A. In this example a solution containing 8 g. of 5-chloro-5H-dibenzo[a,d]cycloheptene in 200 ml. of anhydrous tetrahydrofuran is added dropwise, under nitrogen, to a stirred solution containing 0.042 moles of 3-(2-tetrahydropyranyloxy)-prop-1-ynyl-1-magnesium chloride in 210 ml. of anhydrous tetrahydrofuran, at room temperature. The resulting mixture is heated for two hours at reflux and then allowed to stand, with stirring, for 16 hours at room temperature. The reaction mixture is then treated, first with 25 ml. of saturated aqueous ammonium chloride solution, then with 75 ml. of water, and then concentrated under reduced pressure to remove most of the organic solvent resulting in a two-phase liquid-liquid system, which is then shaken and extracted with three 60 ml. portions of ethyl ether. The ethereal extracts are combined and washed consecutively with 1N aqueous hydrochloric acid, saturated aqueous sodium bicarbonate and saturated brine. The washed extracts are dried over sodium sulfate-potassium carbonate and then evaporated under reduced pressure affording a residue of 5-[3-(2-tetrahydropyranyloxy) - prop - 1 - ynyl]-5H-dibenzo[a,d]cycloheptene, which is divided into two portions, one of which is further purified by column chromatography on silica gel. The other portion is used directly as starting material for the next step.

Similarly, by following the same procedure as above but respectively using the products of Preparation 2 as starting materials, the corresponding 5-[3-(2-tetrahydropyranyloxy)-prop-1-ynyl]- derivatives are respectively prepared.

Similarly, by following the same procedure as above but respectively using 3-(2-tetrahydrofuranyloxy)-prop-1-ynyl magnesium chloride and 3-(1-ethoxycyclohexyloxy)-prop-1-ynyl magnesium chloride in place of 3-(2-tetrahydropyranyloxy) - prop - 1 - ynyl - 1 - magnesium chloride, the corresponding 5-[3-(2-tetrahydrofuranyloxy)-prop-1-ynyl] and 5-[3-(1-ethoxycyclohexyloxy)-prop-1-ynyl] derivatives of the products of Preparation 2 are respectively prepared.

EXAMPLE 2

This example illustrates methods according to step 2 of the process, of our invention, for preparing the compounds of formula A. In this example a solution containing 18.3 g. of crude 5-[3-(2-tetrahydropyranyloxy)-prop-1-ynyl]-5H-dibenzo[a,d]cycloheptene, prepared according to the procedure of Example 1, in 200 ml. of acetone and 20 ml. of concentrated hydrochloric acid is stirred at room temperature until thin-layer chromatographic analysis of a representative sample indicates hydrolysis to be complete (about two hours). The reaction mixture is neutralized by the addition of concentrated ammonium hydroxide and then evaporated under vacuum to remove acetone. The concentrated mixture is extracted with methylene chloride. The methylene chloride extract is washed consecutively with water and saturated brine, then dried over sodium sulfate. The dried extract is evaporated to dryness under vacuum affording a residue of crude 5 - (3 - hydroxyprop - 1 - ynyl)-5H-dibenzo[a,d]cycloheptene which is then further purified by column chromatography over silica gel, deactivated by the addition of 10%, by wt., of water, eluting with acetone-hexane mixtures.

Similarly, by following the same procedure as above but using the corresponding products of Example 1 as starting materials, the following products are respectively prepared:

5-(3-hydroxy-prop-1-ynyl)-3-methyl-5H-dibenzo[a,d] cycloheptene;
5-(3-hydroxy-prop-1-ynyl)-3-pentyl-5H-dibenzo[a,d] cycloheptene;
5-(3-hydroxy-prop-1-ynyl)-3-methoxy-5H-dibenzo[a,d] cycloheptene;
3-ethenyl-5-(3-hydroxy-prop-1-ynyl)-5H-dibenzo[a,d] cycloheptene;
3-fluoro-5-(3-hydroxy-prop-1-ynyl)-5H-dibenzo-[a,d]cycloheptene;
3-chloro-5-(3-hydroxy-prop-1-ynyl)-5H-dibenzo[a,d] cycloheptene;
5-(3-hydroxy-prop-1-ynyl)-3-trifluoromethyl-5H-dibenzo[a,d]cycloheptene;
5-(3-hydroxy-prop-1-ynyl)-3-methylmercapto-5H-dibenzo[a,d]cycloheptene;
3-ethylsulfonyl-5-(3-hydroxy-prop-1-ynyl)-5H-dibenzo-[a,d]cycloheptene;
5-(3-hydroxy-prop-1-ynyl)-3-trifluoromethylsulfonyl-5H-dibenzo[a,d]cycloheptene;
3-(N,N-dimethylsulfamoyl)-5-(3-hydroxy-prop-1-ynyl)-5H-dibenzo[a,d]cycloheptene;
3-cyano-5-(3-hydroxy-prop-1-ynyl)-5H-dibenzo[a,d] cycloheptene;
10,11-dihydro-5-(3-hydroxy-prop-1-ynyl)-5H-dibenzo-[a,d]cycloheptene;
10,11-dihydro-5-(3-hydroxy-prop-1-ynyl)-3-methyl-5H-dibenzo[a,d]cycloheptene;
10,11-dihydro-5-(3-hydroxy-prop-1-ynyl)-3-pentyl-5H-dibenzo[a,d]cycloheptene;
10,11-dihydro-5-(3-hydroxy-prop-1-ynyl)-3-methoxy-5H-dibenzo[a,d]cycloheptene;
10,11-dihydro-3-ethenyl-5-(3-hydroxy-prop-1-ynyl)-5H-dibenzo[a,d]cycloheptene;
10,11-dihydro-3-fluoro-5-(3-hydroxy-prop-1-ynyl)-5H-dibenzo[a,d]cycloheptene;
3-chloro-10,11-dihydro-5-(3-hydroxy-prop-1-ynyl)-5H-dibenzo[a,d]cycloheptene;
10,11-dihydro-5-(3-hydroxy-prop-1-ynyl)-3-trifluoromethyl-5H-dibenzo[a,d]cycloheptene;
10,11-dihydro-5-(3-hydroxy-prop-1-ynyl)-3-methylmercapto-5H-dibenzo[a,d]cycloheptene;
10,11-dihydro-3-ethylsulfonyl-5-(3-hydroxy-prop-1-ynyl)-5H-dibenzo[a,d]cycloheptene; and
10,11-dihydro-3-N,N-dimethylsulfamoyl-5-(3-hydroxy-prop-1-ynyl)-5H-dibenzo[a,d]cycloheptene.

EXAMPLE 3

This example illustrates methods according to step 3 of the process, of our invention, for preparing the compounds of formula A. In this example a solution containing 0.25 g. of 5-(3-hydroxy-prop-1-ynyl)-5H-dibenzo[a,d]cycloheptene in 25 ml. of anhydrous methylene chloride containing 0.25 ml. of triethylamine is stirred and cooled to maintain the temperature between 0° C. and −10° C. and 0.15 ml. of methanesulfonyl chloride is added. Cooling is then discontinued and the temperature of the mixture allowed to rise, with stirring, for 15 minutes. The solution is then poured into ice water, resulting in a two-phase organic-aqueous mixture. The organic layer is separated and washed successively with ice cold 1 Normal aqueous hydrochloric acid, water, and saturated brine, and then dried over sodium sulfate and evaporated under vacuum yielding 5-(3-methanesulfonyloxyprop-1-ynyl)-5H-dibenzo[a,d]cycloheptene which is of sufficient purity to be used directly as starting material for subsequent examples.

Similarly, by following the same procedure as above but respectively using the corresponding products of Example 2 as starting materials, the corresponding 5-(3-methanesulfonyloxyprop-1-ynyl) derivatives are respectively prepared.

EXAMPLE 4

This example illustrates the fourth and final step of the process of our invention for preparing the compounds of formula A. In this example 1 ml. of 40% (wt.) aqueous methylamine, and a sufficient amount of sodium sulfate to absorb the aqueous layer from the reaction mixture (i.e. about 5 g.) is added to a solution containing 0.30 g. of 5-(3-methanesulfonyloxyprop-1-ylyn)-5H-dibenzo[a,d]cycloheptene, prepared according to Example 3, in 35 ml. of methylene chloride at 20° C. The resulting mixture is stirred for 16 hours at room temperature and then filtered. The filtrate is recovered and evaporated under reduced pressure affording a residue which is dissolved in dilute aqueous hydrochloric acid (pH 1) and washed with ethyl ether.

The ether washes are further extracted with 2N aqueous hydrochloric acid, then the combined aqueous phases are made slightly alkaline by the addition of concentrated ammonium hydroxide and extracted with ethyl ether. The ethereal extracts are combined, washed successively with water and saturated brine and dried over sodium sulfate. The dried extracts are evaporated under reduced pressure affording 5-(3-N-methylaminoprop-1-ynyl)-5H-dibenzo[a,d]cycloheptene, which is then further purified and recovered as the crystalline maleic acid salt by dissolution in ethyl ether and treatment with an ethereal solution of maleic acid.

Similarly, by following the same procedure as above but respectively using the corresponding 3-substituted-5-(3-methanesulfonyloxyprop-1-ynyl) - 5H - dibenzo[a,d] cycloheptene and 10,11-dihydro analogs, the following compounds are respectively prepared:

3-methyl-5-(3-N-methylaminoprop-1-ynyl)-5H-dibenzo [a,d]cycloheptene;
5-(3-N-methylaminoprop-1-ynyl)-3-pentyl-5H-dibenzo [a,d]cycloheptene;
3-methoxy-5-(3-N-methylaminoprop-1-ynyl)-5H-dibenzo[a,d]cycloheptene;
3-ethenyl-5-(3-N-methylaminoprop-1-ynyl)-5H-dibenzo [a,d]cycloheptene;
3-fluoro-5-(3-N-methylaminoprop-1-ynyl)-5H-dibenzo [a,d]cycloheptene;
3-chloro-5-(3-N-methylaminoprop-1-ynyl)-5H-dibenzo [a,d]cycloheptene;
5-(3-N-methylaminoprop-1-ynyl)-3-trifluoromethyl-5H-dibenzo[a,d]cycloheptene;
5-(3-N-methylaminoprop-1-ynyl)-3-methylmercapto-5H-dibenzo[a,d]cycloheptene;

3-ethylsulfonyl-5-(3-N-methylaminoprop-1-ynyl)-5H-dibenzo[a,d]cycloheptene;

5-(3-N-methylaminoprop-1-ynyl)-3-trifluoromethylsulfonyl-5H-dibenzo[a,d]cycloheptene;

3-(N,N-dimethylsulfamoyl)-5-(3-methylaminoprop-1-ynyl)-5H-dibenzo[a,d]cycloheptene;

3-cyano-5-(3-N-methylaminoprop-1-ynyl)-5H-dibenzo[a,d]cycloheptene;

10,11-dihydro-5-(3-N-methylaminoprop-1-ynyl)-5H-dibenzo[a,d]cycloheptene;

10,11-dihydro-3-methyl-5-(3-N-methylaminoprop-1-ynyl)-5H-dibenzo[a,d]cycloheptene;

10,11-dihydro-5-(3-N-methylaminoprop-1-ynyl)-3-pentyl-5H-dibenzo[a,d]cycloheptene;

10,11-dihydro-3-methoxy-5-(3-N-methylaminoprop-1-ynyl)-5H-dibenzo[a,d]cycloheptene;

10,11-dihydro-3-ethenyl-5-(3-N-methylaminoprop-1-ynyl)-5H-dibenzo[a,d]cycloheptene;

10,11-dihydro-3-fluoro-5-(3-N-methylaminoprop-1-ynyl)-5H-dibenzo[a,d]cycloheptene;

3-chloro-10,11-dihydro-5-(3-N-methylaminoprop-1-ynyl)-5H-dibenzo[a,d]cycloheptene;

10,11-dihydro-5-(3-N-methylaminoprop-1-ynyl)-3-trifluoromethyl-5H-dibenzo[a,d]cycloheptene;

10,11-dihydro-5-(3-N-methylaminoprop-1-ynyl)-3-methylmercapto-5H-dibenzo[a,d]cycloheptene;

10,11-dihydro-3-ethylsulfonyl-5-(3-N-methylaminoprop-1-ynyl)-5H-dibenzo[a,d]cycloheptene;

10,11-dihydro-5-(3-N-methylaminoprop-1-ynyl)-3-trifluoromethylsulfonyl-5H-dibenzo[a,d]cycloheptene;

10,11-dihydro-3-(N,N-dimethylsulfamoyl)-5-(3-N-methylaminoprop-1-ynyl)-5H-dibenzo[a,d]cycloheptene; and 3-cyano-10,11-dihydro-5-(3-N-methylaminoprop-1-ynyl)-5H-dibenzo[a,d]cycloheptene.

Similarly, by following the same procedure as above but respectively using dimethylamine and diethylamine in place of methylamine, the corresponding 5-(3-N,N-dimethylaminoprop-1-ynyl) and 5-(3-N,N-diethylaminoprop-1-ynyl)-homologues of each of the above products are respectively prepared.

EXAMPLE 5

This example illustrates methods, according to our invention, of preparing cyclic amine derivatives of formula A. In this example 1 gram of N-β-hydroxyethylpiperazine is added to a solution containing 0.31 g. of 5-(3-methanesulfonyloxyprop - 1 - ynyl) - 5H - dibenzo[a,d]cycloheptene, according to Example 3, in 20 ml. of dichloromethane at 0° C. The resulting mixture is monitored by thin-layer chromatographic analysis and allowed to stand at room temperature until conversion of the sulfonate ester is essentially complete. The mixture is then worked up and purified according to the procedure described in Example 4, yielding 5-[3-(N'-β-hydroxyethyl-1-piperazinyl)prop-1-ynyl] - 5H - dibenzo[a,d]cycloheptene.

Similarly, by following the same procedure as above but respectively using the corresponding dibenzocycloheptene starting materials, the corresponding 5-[3-N'-β-hydroxyethyl-1-piperazinyl)prop-1-ynyl] analogs of the products enumerated in Example 4 are respectively prepared.

Similarly, by following the same procedure as above but respectively using piperidine, morpholine, pyrrolidine, and N-methylpiperazine in place of N-β-hydroxyethylpiperazine, the corresponding 5-[3-(N-piperidino)prop-1-ynyl]; 5-(3-[N-morpholino]prop - 1 - ynyl); 5-(3-[N-pyrrolidino]prop-1-ynyl; and 5-(3-[N'-methylpiperazino]prop-1-ynyl) analogs of each of the above products are respectively prepared.

EXAMPLE 6

This example illustrates methods of preparing the sidechain phenacylamino derivatives of formula A. In this example 0.192 mmoles of 5-(3-N-methylaminoprop-1-ynyl)-5H-dibenzo[a,d]cycloheptene and 0.256 mmoles of p-chloro-ω-bromoacetophenone is dissolved in 1 ml. of benzene at 20° C. One milliliter of water containing 2 mg. of sodium sulfite and 20 mg. of sodium bicarbonate is then added with constant stirring. The mixture is then aged for two hours with constant stirring at 20° C. and then poured into 20 ml. of a 1:2 (by vol.) mixture of water and ethyl ether resulting in a liquid-liquid two phase mixture. The ether phase is separated with water and dried over magnesium sulfate. The residue is then further purified by thin-layer chromatography on silica gel, employing a 10% acetone-90% benzene (by vol.) elution system, affording pure 5-(3-[N-methyl-N-(p-chlorophenacyl]aminoprop-1-ynyl]-5H-dibenzo[a,d]cycloheptene.

Similarly, by following the same procedure as above but using the various 5-methylamino derivative products in Example 4 as starting materials, the corresponding phenacyl derivatives are respectively prepared.

Similarly, by following the same procedure as above but replacing ω-bromoacetophenone with the various ω-haloacetophenone derivatives prepared according to Preparation 4, the corresponding substituted phenacyl analogs of each of the above products are respectively prepared.

EXAMPLE 7

This example illustrates methods according to our invention of preparing compounds of formula IV, of our invention. In this example 15 g. of basic alumina (Woelm, Activity I) is added to a solution containing 0.3 g. of 5-(3-N,N - dimethylaminoprop - 1 - ynyl)-5H-dibenzo[a,d]cycloheptene in 20 ml. of anhydrous diethyl ether at room temperature, with constant stirring. The mixture is stirred for one hour and then a sample taken and examined by thin-layer chromatography to ensure that the reaction has gone to completion. The mixture is then filtered to remove the alumina and the filtered cake washed several times with acetone. The filtrate and acetone washings are combined and evaporated under vacuum affording a residue of 5-(3-N,N-dimethylaminoprop-1-enylidene)-5H-dibenzo[a,d]cycloheptene, which is then further purified and crystallized, via treatment with a solution of maleic acid in isopropanol and ethyl ether, as the maleic acid salt.

Similarly, by following the same procedure as above but using the appropriate 3-dimethylaminopropynyl products of Example 4 as starting materials, the following propenylidene derivatives are respectively prepared:

5-(3-N,N-dimethylaminoprop-1-enylidene)-3-methyl-5H-dibenzo[a,d]cycloheptene;

5-(3-N,N-dimethylaminoprop-1-enylidene)-3-pentyl-5H-dibenzo[a,d]cycloheptene;

5-(3-N,N-dimethylaminoprop-1-enylidene)-3-methoxy-5H-dibenzo[a,d]cycloheptene;

5-(3-N,N-dimethylaminoprop-1-enylidene)-3-ethenyl-5H-dibenzo[a,d]cycloheptene;

5-(3-N,N-dimethylaminoprop-1-enylidene)-3-fluoro-5H-dibenzo[a,d]cycloheptene;

3-chloro-5-(3-N,N-dimethylaminoprop-1-enylidene)-5-dibenzo[a,d]cycloheptene;

5-(3-N,N-dimethylaminoprop-1-enylidene)-3-trifluoromethyl-5H-dibenzo[a,d]cycloheptene;

5-(3-N,N-dimethylaminoprop-1-enylidene)-3-methylmercapto-5H-dibenzo[a,d]cycloheptene;

5-(3-N,N-dimethylaminoprop-1-enylidene)-3-ethylsulfonyl-5H-dibenzo[a,d]cycloheptene;

5-(3-N,N-dimethylaminoprop-1-enylidene)-3-trifluoromethylsulfonyl-5H-dibenzo[a,d]cycloheptene;

3-(N,N-dimethylsulfamoyl)-5-(3-N,N-dimethylaminoprop-1-enylidene)-5H-dibenzo[a,d]cycloheptene;

3-cyano-5-(3-N,N-dimethylaminoprop-1-enylidene)-5H-dibenzo[a,d]cycloheptene;
10,11-dihydro-5-(3-N,N-dimethylaminoprop-1-enylidene)-5H-dibenzo[a,d]cycloheptene;
10,11-dihydro-5-(3-N,N-dimethylaminoprop-1-enylidene)-3-methyl-5H-dibenzo[a,d]cycloheptene;
10,11-dihydro-5-(3-N,N-dimethylaminoprop-1-enylidene)-3-pentyl-5H-dibenzo[a,d]cycloheptene;
10,11-dihydro-5-(3-N,N-dimethylaminoprop-1-enylidene)-3-methoxy-5H-dibenzo[a,d]cycloheptene;
10,11-dihydro-5-(3-N,N-dimethylaminoprop-1-enylidene)-3-ethenyl-5H-dibenzo[a,d]cycloheptene;
10,11-dihydro-5-(3-N,N-dimethylaminoprop-1-enylidene)-3-fluoro-5H-dibenzo[a,d]cycloheptene;
3-chloro-10,11-dihydro-5-(3-N,N-dimethylaminoprop-1-enylidene)-5H-dibenzo[a,d]cycloheptene;
10,11-dihydro-5-(3-N,N-dimethylaminoprop-1-enylidene)-3-trifluoromethyl-5H-dibenzo[a,d]cycloheptene;
10,11-dihydro-5-(3-N,N-dimethylaminoprop-1-enylidene)-3-methylmercapto-5H-dibenzo[a,d]cycloheptene;
10,11-dihydro-5-(3-N,N-dimethylaminoprop-1-enylidene)-3-ethylsulfonyl-5H-dibenzo[a,d]cycloheptene;
10,11-dihydro-5-(3-N,N-dimethylaminoprop-1-enylidene)-3-trifluoromethylsulfonyl-5H-dibenzo[a,d]cycloheptene;
10,11-dihydro-3-(N,N-dimethylsulfamoyl)-5-(3-N,N-dimethylaminoprop-1-enylidene)-5H-dibenzo[a,d]cycloheptene; and
3-cyano-10,11-dihydro-5-(3-N,N-dimethylaminoprop-1-enylidene)-5H-dibenzo[a,d]cycloheptene.

Similarly, by following the same procedure as above but using the diethylaminopropynyl products of Example 4 as starting materials, the corresponding 5-(3-N,N-diethylaminoprop-1-enylidene)- homologues of each of the above products are respectively prepared. Each of the above products is then further purified and recovered as its maleic acid salt.

EXAMPLE 8

This example illustrates methods according to our invention of preparing compounds of formula IV, of our invention. In this example 15 g. of basic alumina (Woelm, I) is added to a solution containing 0.3 g. of 5-[N-piperidino]prop-1-ynyl)-5H - dibenzo[a,d]cycloheptene in 20 ml of anhydrous diethyl ether at room temperature, with constant stirring. The mixture is stirred for one hour and then a sample taken and examined by thin-layer chromatography to ensure that the reaction has gone to completion. The mixture is then filtered to remove the alumina and the filtered cake washed several times with acetone. The filtrate and acetone washings are combined and evaporated under vacuum affording a residue of 5-(3-[N-piperidino]prop - 1 - enylidene) - 5H - dibenzo[a,d]cycloheptene, which is then further purified and crystallized, via treatment with a solution of maleic acid in isopropanol and ether, as the maleic acid salt.

Similarly, by following the same procedure as above but using the corresponding products of Example 5 as starting materials, the following amines are respectively prepared and converted into their maleic acid salts:

3-methyl-5-(3-[N-piperidino]prop-1-enylidene)-5H-dibenzo[a,d]cycloheptene;
3-pentyl-5-(3-[N-piperidino]prop-1-enylidene)-5H-dibenzo[a,d]cycloheptene;
3-methoxy-5-(3-[N-piperidino]prop-1-enylidene)-5H-dibenzo[a,d]cycloheptene;
3-ethenyl-5-(3-[N-piperidino]prop-1-enylidene)-5H-dibenzo[a,d]cycloheptene;
3-fluoro-5-(3-[N-piperidino]prop-1-enylidene)-5H-dibenzo[a,d]cycloheptene;
3-chloro-5-(3-[N-piperidino]prop-1-enylidene)-5H-dibenzo[a,d]cycloheptene;
5-(3-[N-piperidino]prop-1-enylidene)-3-trifluoromethyl-5H-dibenzo[a,d]cycloheptene;
3-methylmercapto-5-(3-[N-piperidino]prop-1-enylidene)-5H-dibenzo[a,d]cycloheptene;
3-ethylsulfonyl-5-(3-[N-piperidino]prop-1-enylidene)-5H-dibenzo[a,d]cycloheptene;
5-(3-[N-piperidino]prop-1-enylidene)-3-trifluoromethylsulfonyl-5H-dibenzo[a,d]cycloheptene;
3-(N,N-dimethylsulfamoyl)-5-(3-[N-piperidino]prop-1-enylidene)-5H-dibenzo[a,d]cycloheptene;
3-cyano-5-(3-[N-piperidino]prop-1-enylidene)-5H-dibenzo[a,d]cycloheptene;
10,11-dihydro-5-(3-[N-piperidino]prop-1-enylidene)-5H-dibenzo[a,d]cycloheptene;
10,11-dihydro-3-methyl-5-(3-[N-piperidino]prop-1-enylidene)-5H-dibenzo[a,d]cycloheptene;
10,11-dihydro-3-pentyl-5-(3-[N-piperidino]prop-1-enylidene)-5H-dibenzo[a,d]cycloheptene;
10,11-dihydro-3-methoxy-5-(3-[N-piperidino]prop-1-enylidene)-5H-dibenzo[a,d]cycloheptene;
10,11-dihydro-3-etheynl-5-(3-[N-piperidino]prop-1-enylidene)-5H-dibenzo[a,d]cycloheptene;
10,11-dihydro-3-fluoro-5-(3-[N-piperidino]prop-1-enylidene)-5H-dibenzo[a,d]cycloheptene;
3-chloro-10,11-dihydro-5-(3-[N-piperidino]prop-1-enylidene)-5H-dibenzo[a,d]cycloheptene;
10,11-dihydro-5-(3-[N-piperidino]prop-1-enylidene)-3-trifluoromethyl-5H-dibenzo[a,d]cycloheptene;
10,11-dihydro-3-methylmercapto-5-(3-[N-piperidino]prop-1-enylidene)-5H-dibenzo[a,d]cycloheptene;
10,11-dihydro-3-ethylsulfonyl-5-(3-[N-piperidino]prop-1-enylidene)-5H-dibenzo[a,d]cycloheptene;
10,11-dihydro-3-(N,N-dimethylsulfamoyl)-5-(3-[N-piperidino]prop-1-enylidene)-5H-dibenzo[a,d]cycloheptene; and
3-cyano-10,11-dihydro-5-(3-[N-piperidino]prop-1-enylidene)-5H-dibenzo[a,d]cycloheptene.

Similarly, by following the same procedure as above but using the N-morpholino, N-pyrrolidino, and N'-methyl-N-piperazino products of Example 5 as starting materials, the corresponding 5-(3-[N-morpholino]prop-1-enylidene); 5-(3-[N-pyrrolidino]prop-1-enylidene) and 5-(3-[N'-methyl-N-piperazino]prop-1-enylidene) analogs of each of the above products are respectively prepared.

EXAMPLE 9

This example illustrates methods according to our invention of preparing compounds of formula IV, of our invention. In this example 15 g. of basic alumina (Woelm, I) is added to a solution containing 0.3 g. of 5-(3-[N-methyl-N-(p-chlorophenacyl)]aminoprop - 1 - ynyl)-5H-dibenzo[a,d]cycloheptene in 20 ml. of anhydrous diethyl ether at room temperature, with constant stirring. The mixture is stirred for 16 hours and then a sample taken and examined by thin-layer chromatography to ensure that the reaction has gone to completion. The mixture is then filtered to remove the alumina and the filtered cake washed several times with acetone. The filtrate and acetone washings are combined and evaporated under vacuum affording a residue of 5-(3-[N-methyl-N-(p-chlorophenacyl)]aminoprop-1-enylidene) - 5H - dibenzo[a,d]cycloheptene, which is then further purified, via treatment with a solution of maleic acid in isopropanol and ether, as the maleic acid salt.

Similarly, by following the same procedure as above but respectively using the products of Example 6 as starting materials, the corresponding compounds are respectively prepared and converted into their maleic acid salts:

3-methyl-5-(3-[N-methyl-N-(p-chlorophenacyl)]aminoprop-1-enylidene)-5H-dibenzo[a,d]cycloheptene;
3-methoxy-5-(3-[N-methyl-N-(p-chlorophenacyl)]aminoprop-1-enylidene)-5H-dibenzo[a,d]cycloheptene;
3-ethenyl-5-(3-[N-methyl-N-(p-chlorophenacyl)]aminoprop-1-enylidene)-5H-dibenzo[a,d]cycloheptene;

3-fluoro-5-(3-[N-methyl-N-(p-chlorophenacyl)]amino-
   prop-1-enylidene)-5H-dibenzo[a,d]cycloheptene;
3-chloro-5-(3-[N-methyl-N-(p-chlorophenacyl)]amino-
   prop-1-enylidene)-5H-dibenzo[a,d]cycloheptene;
5-(3-[N-methyl-N-(p-chlorophenacyl)]aminoprop-1-
   enylidene)-3-trifluoromethyl-5H-dibenzo[a,d]cyclo-
   heptene;
5-(3-[N-methyl-N-(p-chlorophenacyl)]aminoprop-1-
   enylidene)-3-methylmercapto-5H-dibenzo[a,d]cyclo-
   heptene;
3-ethylsulfonyl-5-(3-[N-methyl-N-(p-chlorophenacyl)]
   aminoprop-1-enylidene)-5H-dibenzo[a,d]cycloheptene;
5-(3-[N-methyl-N-(p-chlorophenacyl)]aminoprop-1-
   enylidene)-3-trifluoromethylsulfonyl-5H-dibenzo[a,d]
   cycloheptene;
3-(N,N-dimethylsulfamoyl)-5-(3-[N-methyl-N-(p-chloro-
   phenacyl)]aminoprop-1-enylidene)-5H-dibenzo[a,d]
   cycloheptene;
3-cyano-5-(3-[N-methyl-N-(p-chlorophenacyl)]amino-
   prop-1-enylidene)-5H-dibenzo[a,d]cycloheptene;
10,11-dihydro-5-(3-[N-methyl-N-(p-chlorophenacyl)]
   aminoprop-1-enylidene)-5H-dibenzo[a,d]cycloheptene;
10,11-dihydro-3-methyl-5-(3-[N-methyl-N-(p-chloro-
   phenacyl)]aminoprop-1-enylidene)-5H-dibenzo[a,d]
   cycloheptene;
10,11-dihydro-5-(3-[N-methyl-N-(p-chlorophenacyl)]
   amino-prop-1-enylidene)-3-pentyl-5H-dibenzo[a,d]
   cycloheptene;
10,11-dihydro-3-fluoro-5-(3-[N-methyl-N-(p-chlorophen-
   acyl)]aminoprop-1-enylidene)-5H-dibenzo[a,d]cyclo-
   heptene;
3-chloro-10,11-dihydro-5-(3-[N-methyl-N-(p-chlorophen-
   acyl)]aminoprop-1-enylidene)-5H-dibenzo[a,d]
   cycloheptene;
10,11-dihydro-5-(3-[N-methyl-N-(p-chlorophenacyl)]
   aminoprop-1-enylidene)-3-trifluoromethyl-5H-dibenzo
   [a,d]cycloheptene;
10,11-dihydro-5-(3-[N-methyl-N-(p-chlorophenacyl)]
   amino-prop-1-enylidene)-3-methylmercapto-5H-di-
   benzo[a,d]cycloheptene;
10,11-dihydro-3-ethylsulfonyl-5-(3-[N-methyl-N-(p-
   chlorophenacyl)]aminoprop-1-enylidene)-5H-dibenzo
   [a,d]cycloheptene;
10,11-dihydro-5-(3-[N-methyl-N-(p-chlorophenacyl)]
   amino-prop-1-enylidene)-3-trifluoromethylsulfonyl-
   5H-dibenzo[a,d]cycloheptene;
10,11-dihydro-3-N,N-dimethylsulfamoyl-5-(3-[N-
   methyl-N-(p-chlorophenacyl)]aminoprop-1-enyl-
   idene)-5H-dibenzo[a,d]cycloheptene; and
3-cyano-10,11-dihydro-5-(3-[N-methyl-N-(p-chlorophen-
   acyl)]aminoprop-1-enylidene)-5H-dibenzo[a,d]
   cycloheptene Similarly, by following the same procedure as above but respectively using the remaining products of Example 6 as starting materials, the corresponding aminoprop-1-enylidene derivatives are respectively prepared.

EXAMPLE 10

This example illustrates methods, according to our invention, of preparing the compounds of formula IV of our invention using a homogeneous base-organic solvent system. In this example 0.5 ml. of a 40% wt. solution of benzyltrimethylammonium hydroxide in methanol is added to a stirred solution containing 0.5 g. of 10,11-dihydro-5-[3-(N'-β-hydroxyethyl-N-piperazino)-prop-1-ynyl]5H-dibenzo[a,d]cycloheptene in 100 ml. of ethyl ether at 20° C. The reaction mixture is stirred at room temperature for 16 hours and then a small sample is taken and examined by thin-layer chromatography to show the indicated conversion of the acetylene side-chain moiety to the desired allene side-chain moiety. The reaction mixture is then washed with three 10 ml. portions of water, then with saturated brine, and then dried over sodium sulfate and evaporated to dryness, under reduced pressure, affording 10,11 - dihydro - 5-[3-(N'-β-hydroxyethyl-N-piperazino)-
   prop-1-enylidene]-5H-dibenzo[a,d]cycloheptene.

Similarly, by following the same procedure as above using the corresponding 5-[3-(N'-β-hydroxyethyl-N-piperazino)-prop-1-ynyl] derivatives as starting materials, the following compounds are respectively prepared:

10,11-dihydro-5-[3-(N'-β-hydroxyethyl-N-piperazino)-
   prop-1-enylidene]-3-methyl-5H-dibenzo[a,d]cyclo-
   heptene;
10,11-dihydro-5-[3-(N'-β-hydroxyethyl-N-piperazino)-
   prop-1-enylidene]-3-methoxy-5H-dibenzo[a,d]
   cycloheptene;
10,11-dihydro-3-ethenyl-5-[3-(N'-β-hydroxyethyl-N-
   piperazino)-prop-1-enylidene]-5H-dibenzo[a,d]
   cycloheptene;
10,11-dihydro-3-fluoro-5-[3-(N'-β-hydroxyethyl-N-
   piperazino)-prop-1-enylidene]-5H-dibenzo[a,d]
   cycloheptene;
3-chloro-10,11-dihydro-5-[3-(N'-β-hydroxyethyl-N-
   piperazino)-prop-1-enylidene]-5H-dibenzo[a,d]
   cycloheptene;
10,11-dihydro-5-[3-(N'-β-hydroxyethyl-N-piperazino)-
   prop-1-enylidene]-3-trifluoromethyl-5H-dibenzo[a,d]
   cycloheptene;
10,11-dihydro-5-[3-(N'-β-hydroxyethyl-N-piperazino)-
   prop-1-enylidene]-3-methylmercapto-5H-dibenzo[a,d]
   cycloheptene;
10,11-dihydro-3-ethylsulfonyl-5-[3-(N'-β-hydroxyethyl-
   N-piperazino)-prop-1-enylidene]-5H-dibenzo[a,d]
   cycloheptene;
10,11-dihydro-5-[3-(N'-β-hydroxyethyl-N-piperazino)-
   prop-1-enylidene]-3-trifluoromethylsulfonyl-5H-di-
   benzo[a,d]cycloheptene;
10,11-dihydro-5-[3-(N'-β-hydroxyethyl-N-piperazino)-
   prop-1-enylidene]-3-(N,N-dimethylsulfamoyl)-5H-di-
   benzo[a,d]cycloheptene;
3-cyano-10,11-dihydro-5-[3-(N'-β-hydroxyethyl-N-
   piperazino)-prop-1-enylidene]-5H-dibenzo[a,d]cyclo-
   heptene;
5-[3-(N'-β-hydroxyethyl-N-piperazino)-prop-1-enylidene]-
   5H-dibenzo[a,d]cycloheptene;
5-[3-(N'-β-hydroxyethyl-N-piperazino)-prop-1-enyl-
   idene]-3-methyl-5H-dibenzo[a,d]cycloheptene;
5-[3-(N'-β-hydroxyethyl-N-piperazino)-prop-1-enyli-
   dene]-3-methoxy-5H-dibenzo[a,d]cycloheptene;
3-ethenyl-5-[3-(N'-β-hydroxyethyl-N-piperazino)-prop-
   1-enylidene]-5H-dibenzo[a,d]cycloheptene;
3-fluoro-5-[3-(N'-β-hydroxyethyl-N-piperazino)-prop-
   1-enylidene]-5H-dibenzo[a,d]cycloheptene;
3-chloro-5-[3-(N'-β-hydroxyethyl-N-piperazino)-prop-
   1-enylidene]-5H-dibenzo[a,d]cycloheptene;
5-[3-(N'-β-hydroxyethyl-N-piperazino)-prop-1-enylidene]-
   3-trifluoromethyl-5H-dibenzo[a,d]cycloheptene;
5-[3-(N'-β-hydroxyethyl-N-piperazino)-prop-1-ethyli-
   dene]-3-methylmercapto-5H-dibenzo[a,d]cyclo-
   heptene;
3-ethylsulfonyl-5-[3-(N'-β-hydroxyethyl-N-piperazino)-
   prop-1-enylidene]-5H-dibenzo[a,d]cycloheptene;
5-[3-(N'-β-hydroxyethyl-N-piperazino)-prop-1-enyli-
   dene] - 3 - trifluoromethylsulfonyl-5H-dibenzo[a,d]
   cycloheptene;
5-[3-(N'-β-hydroxyethyl-N-piperazino-prop-1-enyli-
   dene]-3-N,N-dimethylsulfamoyl-5H-dibenzo[a,d]
   cycloheptene; and
3-cyano-5-[3-(N'-β-hydroxyethyl-N-piperazino]-prop-
   1-enylidene]-5H-dibenzo[a,d]cycloheptene.

Similarly, by using the appropriate starting material and amine reactant, the allene products prepared in Examples 7, 8, and 9 are also respectively prepared according to the above procedure.

EXAMPLE 11

This example illustrates methods according to 1a of the process of our invention. In this example 1.0 g. of 5-[3-(2 - tetrahydropyranyloxy)-prop - 1 - ynyl]-5H-dibenzo[a,d]cycloheptene in 30 ml. of anhydrous ethyl ether is heated for 18 hours at reflux with 15 g. of alkaline alumina (Woelm, Activity I). The reaction mixture is then cooled to room temperature and filtered, and the resulting filtered cake is washed with three 10 ml. portions of acetone. The combined filtrates and washes are evaporated under reduced pressure yielding a residue of 5-[3-(2-tetrahydropyranyloxy) - prop - 1-enylidene]-5H-dibenzo[a,d]cycloheptene.

Similarly, by following the same procedure as above but using the corresponding 5-[3-(2-tetrahydropyranyloxy)-prop-1-ynyl] derivatives as starting materials, the following compounds are respectively prepared:

3-methyl-5-[3-(2-tetrahydropyranyloxy)-prop-1-enylidene]-5H-dibenzo[a,d]cycloheptene;
3-pentyl-5-[3-(2-tetrahydropyranyloxy)-prop-1-enylidene]-5H-dibenzo[a,d]cycloheptene;
3-methoxy-5-[3-(2-tetrahydropyranyloxy)-prop-1-enylidene]-5H-dibenzo[a,d]cycloheptene;
3-ethenyl-5-[3-(2-tetrahydropyranyloxy)-propy-1-enylidene]-5H-dibenzo[a,d]cycloheptene;
3-fluoro-5-[3-(2-tetrahydropyranyloxy)-prop-1-enylidene]-5H-dibenzo[a,d]cycloheptene;
3-chloro-5-[3-(2-tetrahydropyranyloxy)-prop-1-enylidene]-5H-dibenzo[a,d]cycloheptene;
5-[3-(2-tetrahydropyranyloxy)-prop-1-enylidene]-3-trifluoromethyl-5H-dibenzo[a,d]cycloheptene;
3-methylmercapto-5-[3-(2-tetrahydropyranyloxy)-prop-1-enylidene]-5H-dibenzo[a,d]cycloheptene;
3-ethylsulfonyl-5-[3-(2-tetrahydropyranyloxy)-prop-1-enylidene]-5H-dibenzo[a,d]cycloheptene;
5-[3-(2-tetrahydropyranyloxy)-prop-1-enylidene]-3-trifluoromethylsulfonyl-5H-dibenzo[a,d]cycloheptene;
3-(N,N-dimethylsulfamoyl)-5-[3-(2-tetrahydropyranyloxy)-prop-1-enylidene]-5H-dibenzo[a,d]cycloheptene;
3-cyano-5-[3-(2-tetrahydropyranyloxy)-prop-1-enylidene]-5H-dibenzo[a,d]cycloheptene;
10,11-dihydro-5-[3-(2-tetrahydropyranyloxy)-prop-1-enylidene]-5H-dibenzo]a,d]cycloheptene;
10,11-dihydro-3-methyl-5-[3-(2-tetrahydropyranyloxy)-prop-1-enylidene]-5H-dibenzo[a,d]cycloheptene;
10,11-dihydro-3-pentyl-5-[3-(2-tetrahydropyranyloxy)-prop-1-enylidene]-5H-dibenzo[a,d]cycloheptene;
10,11-dihydro-3-methoxy-5-[3-(2-tetrahydropyranyloxy)-prop-1-enylidene]-5H-dibenzo[a,d]cycloheptene;
10,11-dihydro-3-ethenyl-5-[3-(2-tetrahydropyranyloxy)-prop-1-enylidene]-5H-dibenzo[a,d]cycloheptene;
10,11-dihydro-3-fluoro-5-[3-(2-tetrahydropyranyloxy)-prop-1-enylidene]-5H-dibenzo[a,d]cycloheptene;
3-chloro-10,11-dihydro-5-[3-(2-tetrahydropyranyloxy)-prop-1-enylidene]-5H-dibenzo[a,d]cycloheptene;
10,11-dihydro-5-[3-(2-tetrahydropyranyloxy)-prop-1-enylidene]-3-trifluoromethyl-5H-dibenzo[a,d]cycloheptene;
10,11-dihydro-3-methylmercapto-5-[3-(2-tetrahydropyranyloxy)-prop-1-enylidene]-5H-dibenzo[a,d]cycloheptene;
10,11-dihydro-3-ethylsulfonyl-5-[3-(2-tetrahydropyranyloxy)-prop-1-enylidene]-5H-dibenzo[a,d]cycloheptene;
10,11-dihydro-5-[3-(2-tetrahydropyranyloxy)-prop-1-enylidene]-3-trifluoromethylsulfonyl-5H-dibenzo[a,d]cycloheptene;
10,11-dihydro-3-(N,N-dimethylsulfamoyl)-5-[3-(2-tetrahydropyranyloxy)-prop-1-enylidene]-5H-dibenzo[a,d]cycloheptene; and
3-cyano-10,11-dihydro-5-[3-(2-tetrahydropyranyloxy)-prop-1-enylidene]-5H-dibenzo[a,d]cycloheptene.

EXAMPLE 12

In this example the products prepared in Example 11 are prepared from the same respective starting materials but in this instance by applying the rearrangement procedure described in Example 10 in place of the procedure of Example 11.

EXAMPLE 13

This example illustrates methods according to step 1a' of our invention. In this example 0.1 g. of 5-(3-hydroxyprop - 1 - ynyl)-5H-dibenzo[a,d]cycloheptene is dissolved in 20 ml. of a solution made by dissolving 5 g. of potassium hydroxide in 95 ml. of methanol. The reaction mixture is allowed to stand for one hour and then a sample taken and examined by thin-layer chromatography to ensure the complete conversion of acetylene to allene. The reaction mixture is adjusted to pH 6 by the addition of 1N aqueous hydrochloric acid and then concentrated by evaporation under reduced pressure to about ½ of its original volume. The concentrate is then extracted with three 15 ml. portions of ethyl ether and the resulting extracts combined and washed extensively with saturated aqueous sodium bicarbonate and saturated brine, dried over magnesium sulfate and evaporated, under reduced pressure, to dryness to afford a residue of crude 5-(3-hydroxyprop-1-enylidene) - 5H - dibenzo[a,d]cycloheptene, which is further purified by preparative thin-layer chromatography on silica gel employing a 5% acetone-95% benzene (vol.) developing system.

Similarly, by following the same procedure but using the corresponding 3-hydroxyprop-1-ynyl- derivatives as starting materials, the following compounds are respectively prepared:

5-(3-hydroxy-prop-1-enylidene)-3-methyl-5H-dibenzo-[a,d]cycloheptene;
5-(3-hydroxy-prop-1-enylidene)-3-pentyl-5H-dibenzo-[a,d]cycloheptene;
5-(3-hydroxy-prop-1-enylidene)-3-methoxy-5H-dibenzo-[a,d]cycloheptene;
3-ethenyl-5-(3-hydroxy-prop-1-enylidene)-5H-dibenzo-[a,d]cycloheptene;
3-fluoro-5-(3-hydroxy-prop-1-enylidene)-5H-dibenzo[a,d]cycloheptene;
3-chloro-5-(3-hydroxy-prop-1-enylidene)-5H-dibenzo-[a,d]cycloheptene;
5-(3-hydroxy-prop-1-enylidene)-3-trifluoromethyl-5H-dibenzo[a,d]cycloheptene;
5-(3-hydroxy-prop-1-enylidene)-3-methylmercapto-5H-dibenzo[a,d]cycloheptene;
3-ethylsulfonyl-5-(3-hydroxy-prop-1-enylidene)-5H-dibenzo[a,d]cycloheptene;
5-(3-hydroxy-prop-1-enylidene)-3-trifluoromethylsulfonyl-5H-dibenzo[a,d]cycloheptene;
3-(N,N-dimethylsulfamoyl)-5-(3-hydroxy-prop-1-enylidene)-5H-dibenzo[a,d]cycloheptene;
3-cyano-5-(3-hydroxy-prop-1-enylidene)-5-dibenzo[a,d]cycloheptene;
10,11-dihydro-5-(3-hydroxy-prop-1-enylidene)-5H-dibenzo[a,d]cycloheptene;
10,11-dihydro-5-(3-hydroxy-prop-1-enylidene)-3-methyl 5H-dibenzo[a,d]cyclopentene;
10,11-dihydro-5-(3-hydroxy-prop-1-enylidene)-3-pentyl-5H-dibenzo[a,d]cycloheptene;
10,11-dihydro-5-(3-hydroxy-prop-1-enylidene)-3-methoxy-5H-dibenzo[a,d]cycloheptene;
10,11-dihydro-3-ethenyl-5-(3-hydroxy-prop-1-enylidene)-5H-dibenzo[a,d]cycloheptene;
10,11-dihydro-3-fluoro-5-(3-hydroxy-prop-1-enylidene)-5H-dibenzo[a,d]cycloheptene;
3-chloro-10,11-dihydro-5-(3-hydroxy-prop-1-enylidene)-5H-dibenzo[a,d]cycloheptene;
10,11-dihydro-5-(3-hydroxy-prop-1-enylidene)-3-trifluoromethyl-5H-dibenzo[a,d]cycloheptene;
10,11-dihydro-5-(3-hydroxy-prop-1-enylidene)-3-methylmercapto-5H-dibenzo[a,d]cycloheptene;
10,11-dihydro-3-ethylsulfonyl-5-(3-hydroxy-prop-1-enylidene)-5-dibenzo[a,d]cycloheptene;
10,11-dihydro-3-(N,N-dimethylsulfamoyl)-5-(3-hydroxy-prop-1-enylidene)-5H-dibenzo[a,d]cycloheptene; and 3-cyano-10,11-dihydro-5-(3-hydroxyprop-1-enylidene)-5H-dibenzo[a,d]cycloheptene.

EXAMPLE 14

This example illustrates step 2a of our process. In this example a solution of 3.0 g. of 5-[3-(2-tetrahydropyranyloxy)-prop-1-enylidene]-5H - dibenzo[a,d]cycloheptene in 250 ml. of acetone containing 5 ml. of concentrated hydrochloric acid is heated at reflux for 10 minutes, at which time thin-layer chromatographic examination of a reaction aliquot indicates the complete consumption of starting material. The mixture is allowed to cool, then adjusted to pH 6 by the careful addition of aqueous sodium bicarbonate. After most of the acetone is removed by concentration under reduced pressure, the mixture is extracted with methylene chloride. The extracts are washed successively with saturated aqueous sodium bicarbonate and saturated brine, dried over magnesium sulfate and evaporated to dryness under reduced pressure to afford a residue of crude 5-(3-hydroxy-prop-1-enylidene)-5H-dibenzo[a,d]cycloheptene. Further purification is effected by chromatography on silica gel deactivated by the addition of 10% by weight of water, employing a 25% acetone-75% hexane mixture as the eluting solvent.

Similarly, by following the same procedure but respectively using the products of Example 12 as starting materials, the corresponding 5-(3-hydroxy-prop-1-enylidene) derivatves are respectively prepared.

EXAMPLE 15

This example illustrates step 3a of our process.

To a stirred solution of 0.602 g. of 5-(2-hydroxy-prop-1-enylidene)-5H-dibenzo[a,d]cycloheptene in 60 ml. of dry methylene chloride containing 0.6 ml. of triethylamine at —15° to —20° C. is added 0.4 ml. of methanesulfonyl chloride in one portion. After stirring for 30 minutes at the same temperature, the mixture is poured into ice water and adjusted to pH 2 by addition of dilute hydrochloric acid. The organic phase is separated, washed successively with water and saturated brine, dried over sodium sulfate, and filtered. The filtrate is evaporated yielding a residue of 5-(3-methanesulfonyloxyprop-1-enylidene)-5H-dibenzo[a,d]cycloheptene which is of sufficient purity to be used directly as starting material for the process described in Example 16.

Similarly, by following the same procedure respectively using the corresponding products of Example 13 as starting material, the following products are respectively prepared:

5-(3-methanesulfonyloxyprop-1-enylidene)-3-methyl-5H-dibenzo[a,d]cycloheptene;
5-(3-methanesulfonyloxyprop-1-enylidene)-3-pentyl-5H-dibenzo[a,d]cycloheptene;
5-(3-methanesulfonyloxyprop-1-enylidene)-3-methoxy-5H-dibenzo[a,d]cycloheptene;
3-ethenyl-5-(3-methanesulfonyloxyprop-1-enylidene)-5H-dibenzo[a,d]cycloheptene;
3-fluoro-5-(3-methanesulfonyloxyprop-1-enylidene)-5H-dibenzo[a,d]cycloheptene;
3-chloro-5-(3-methanesulfonyloxyprop-1-enylidene)-5H-dibenzo[a,d]cycloheptene;
5-(3-methanesulfonyloxyprop-1-enylidene)-3-trifluoromethyl-5H-dibenzo[a,d]cycloheptene;
5-(3-methanesulfonyloxyprop-1-enylidene)-3-methylmercapto-5H-dibenzo[a,d]cycloheptene;
3-ethylsulfonyl-5-(3-methanesulfonyloxyprop-1-enylidene)-5H-dibenzo[a,d]cycloheptene;
5-(3-methanesulfonyloxyprop-1-enylidene)-3-trifluoromethylsulfonyl-5H-dibenzo[a,d]cycloheptene;
3-(N,N-dimethylsulfamoyl)-5-(3-methanesulfonyloxy-1-enylidene)-5H-dibenzo[a,d]cycloheptene;
3-cyano-5-(3-methanesulfonyloxyprop-1-enylidene)-5H-dibenzo[a,d]cycloheptene;
10,11-dihydro-5-(3-methanesulfonyloxyprop-1-enylidene)-5H-dibenzo[a,d]cycloheptene;
10,11-dihydro-5-(3-methanesulfonyloxyprop-1-enylidene)-3-methyl-5H-dibenzo[a,d]cycloheptene;
10,11-dihydro-5-(3-methanesulfonyloxyprop-1-enylidene)-3-pentyl-5H-dibenzo[a,d]cycloheptene;
10,11-dihydro-5-(3-methanesulfonyloxyprop-1-enylidene)-3-methoxy-5H-dibenzo[a,d]cycloheptene;
10,11-dihydro-3-ethenyl-5-(3-methanesulfonyloxyprop-1-enylidene)-5H-dibzenzo[a,d]cycloheptene;
10,11-dihydro-3-fluoro-5-(3-methanesulfonyloxyprop-1-enylidene)-5H-dibenzo[a,d]cycloheptene;
3-chloro-10,11-dihydro-5-(3-methanesulfonyloxyprop-1-enylidene)-5H-dibenzo[a,d]cycloheptene;
10,11-dihydro-5-(3-methanesulfonyloxyprop-1-enylidene)-3-trifluoromethyl-5H-dibenzo[a,d]cycloheptene;
10,11-dihydro-5-(3-methanesulfonyloxyprop-1-enylidene)-3-methylmercapto-5H-dibenzo[a,d]cycloheptene;
10,11-dihydro-3-fluoro-5-(3-methanesulfonyloxyprop-1-prop-1-enylidene)-5H-dibenzo[a,d]cycloheptene;
10,11dihydro-5(-3-N,N-dimethylsulfamoyl)-5-(3-methanesulfonyloxyprop-1-enylidene)-5H-dibenzo[a,d]cycloheptene; and
3-cyano-10,11-dihydro-5-(3-methanesulfonyloxyprop-1-enylidene)-5H-dibenzo[a,d]cycloheptene.

EXAMPLE 16

This example illustrates step 4a of our process. In this example a solution of 1.08 g. of crude 5-(3-methanesulfonyloxyprop - 1 - enylidene)-5H-dibenzo[a,d]cycloheptene, prepared according to Example 15, in 40 ml. of methylene chloride is treated with 2 ml. of N-β-hydroxyethylpiperazine, and the resulting mixture is stirred for 40 hours at room temperature. The mixture is then treated with 20 ml. of water and sufficiently dilute hydrochloric acid to bring the aqueous phase to pH 4–5. After removal of the methylene chloride by evaporation under reduced pressure, the aqueous residue is brought to pH 1 by additional hydrochloric acid and then washed with ethyl ether. The aqueous layer is cooled in an ice bath, made alkaline by careful addition of ammonium hydroxide, and extracted first with ether and then with methylene chloride. The combined organic extracts are washed with saturated brine, dried over sodium sulfate, and evaporated to dryness under reduced pressure to give a residue of 5-[3-(N'-β - hydroxyethyl-N-piperazino)-prop-1-enylidene]-5H-dibenzo[a,d]cycloheptene. Further purification is effected by treatment of a methylene chloride-ether solution of the crude amine with a saturated ethereal solution of maleic acid to give a crystalline bis-maleic acid salt.

Similarly, by following the same procedure but respectively using the filtered crude product solutions prepared in Example 15 as starting materials, the corresponding 5 - [3 - (N' - β-hydroxyethyl-N-piperazino)-prop-1-enylidene]-derivatives are respectively prepared.

Similarly, by following the same procedure but respectively using the appropriate product solution, prepared according to Example 15, and the appropriate amine reagents, the products prepared in Examples 7, 8 and 10, are also respectively prepared.

Obviously many modifications and variations of the invention, described herein above and below in the Claims, can be made without departing from the essence and scope thereof.

What is claimed is:

1. A compound selected from the group having the formula:

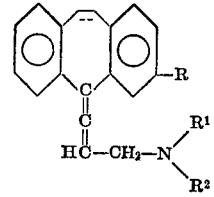

(IV)

wherein the dotted line indicates either a saturated (ethylene) bridge or an unsaturated (vinyl) bridge between the C–10 and C–11 carbon atoms;

R is hydrogen, lower alkyl, lower alkoxy, lower alkenyl, halo, trifluoromethyl, lower alkylsulfonyl, trifluoromethyl, trifluoromethylsulfonyl, lower thioalkyl, lower dialkylsulfamoyl, or cyano; and $R^1$ and $R^2$ are independently hydrogen, lower alkyl, lower cycloalkyl, phenylalkyl, hydroxyalkoxyalkyl, phenacyl of the formula

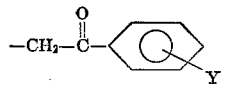

wherein Y is hydrogen, halo, halo lower alkyl having from one through four halo atoms, lower alkyl, or lower alkoxy, and wherein Y can be at any positoin on the phenyl ring; or $R^1$ and $R^2$ together with the nitrogen atom to which they are joined form a nitrogen heterocyclic ring having from 5 through 7 ring atoms and wherein in addition to said joining nitrogen said heterocyclic ring can have one additional hetero ring atom selected from the group of nitrogen, sulfur, and oxygen, or $R^1$ and $R^2$ together with the nitrogen atom to which they are joined form a substituted heterocyclic ring having the formula:

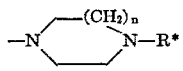

wherein $n$ is 1 or 2 and R* is H, lower alkyl, or hydroxyalkyl;

and pharmaceutically acceptable salts thereof.

2. The compound of Claim 1 wherein R is selected from the group consisting of hydrogen, chloro, cyano, trifluoromethyl and N,N-dimethylsulfamoyl.

3. The compound of Claim 1 wherein one of $R^1$ or $R^2$ is methyl and the other is selected from the group consisting of hydrogen, methyl and p-chlorophenacyl.

4. The compound of Claim 3 wherein R is selected from the group consisting of hydrogen, cyano, trifluoromethyl and N,N-dimethylsulfamoyl.

5. The compound of Claim 1 wherein $R^1$ and $R^2$ together with the nitrogen atom to which they are joined form a substituted heterocycle selected from the group consisting of N - (N' - methyl)piperazinyl and N'-β-hydroxyethyl-N-piperazinyl.

6. The compound of Claim 1 of formula IV wherein said compound has the formula:

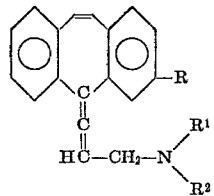

wherein R, $R^1$ and $R^2$ are as defined in Claim 1;

and pharmaceutically acceptable salts thereof.

7. The compound of Claim 1 wherein said compound is 5 - (3 - dimethylaminoprop-1-enylidene)-5H-dibenzo[a,d]cycloheptene or a pharmaceutically acceptable salt thereof.

8. The compound of Claim 1 wherein said compound is 5 - (3 - methylaminoprop-1-enylidene)-5H-dibenzo[a,d]cycloheptene or a pharmaceutically acceptable salt thereof.

9. The compound of Claim 1 wherein said compound is 5 - (3-[N-methyl-N-(p-chlorophenacyl)]aminoprop-1-enylidene) - 5-H-dibenzo[a,d]cycloheptene or a pharmaceutically acceptable salt thereof.

10. The compound of Claim 6 wherein said compound is 5 - (3 - [N'-(β-hydroxyethyl)N-piperazino]prop - 1-enylidene) - 5H - dibenzo[a,d]cycloheptene or a pharmaceutically acceptable salt thereof.

11. The compound of Claim 6 wherein said compound is 3 - cyano - 5 - (3 - dimethylaminoprop - 1 - enylidene)-5H - dibenzo[a,d]cycloheptene or a pharmaceutically acceptable salt thereof.

12. The compound of Claim 6 wherein said compound is 5 - (3 - dimethylaminoprop - 1 - enylidene) - 3-trifluoromethyl - 5H - dibenzo[a,d]cycloheptene or a pharmaceutically acceptable salt thereof.

13. The compound of Claim 6 wherein said compound is 5 - (3 - dimethylaminoprop - 1 - enylidene) - 3-dimethylsulfamoyl - 5H - dibenzo[a,d]cycloheptene or a pharmaceutically acceptable salt thereof.

14. The compound of Claim 6 wherein said compound is 5 - (3 - [N'-(β-hydroxyethyl)N-piperazino] - 3 - trifluoromethylprop - 1 - enylidene) - 5H - dibenzo[a,d]cycloheptene or a pharmaceutically acceptable salt thereof.

15. The compound of Claim 6 wherein said compound is 3 - cyano - 5 - (3 - [N'-methyl-N-piperazino]prop - 1-enylidene) - 5H - dibenzo[a,d]cycloheptene or a pharmaceutically acceptable salt thereof.

16. The compound of Claim 6 wherein said compound is 3 - chloro - 5 - (3 - dimethylaminoprop - 1 - enylidene)-5H - dibenzo[a,d]cycloheptene or a pharmaceutically acceptable salt thereof.

17. The compound of Claim 1 of formula IV wherein said compound has the formula:

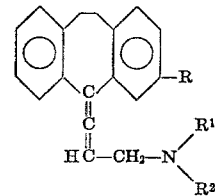

wherein R, $R^1$ and $R^2$ are as defined in Claim 1;
and pharmaceutically acceptable salts thereof.

18. The compound of claim 17 wherein said compound is 10,11 - dihydro - 5 - (3 - dimethylaminoprop - 11-enylidene) - 5H - dibenzo[a,d]cycloheptene or a pharmaceutically acceptable salt thereof.

19. The compound of Claim 17 wherein said compound is 10,11 - dihydro - 5 - (3 - methylaminoprop - 1-enylidene) - 5H - dibenzo[a,d]cycloheptene or a pharmaceutically acceptable salt thereof.

20. The compound of Claim 17 wherein said compound is 10,11 - dihydro - 5 - (3 - [N-methyl-N-(p-chlorophenacyl)]aminoprop - 1 - enylidene) - 5H - dibenzo[a,d]cycloheptene or a pharmaceutically acceptable salt thereof.

21. The compound of Claim 17 wherein said compound is 10,11 - dihydro - 5 - (3 - [N'-(β-hydroxyethyl) N-piperazino]prop - 1 - enylidene) - 5H - dibenzo[a,d] cycloheptene or a pharmaceutically acceptable salt thereof.

22. The compound of Claim 17 wherein said compound is 3 - cyano - 10,11 - dihydro - 5 - (3 - dimethylaminoprop - 1 - enylidene) - 5H - dibenzo[a,d]cycloheptene or a pharmaceutically acceptable salt thereof.

23. The compound of Claim 17 wherein said compound is 10,11 - dihydro - 5 - (3 - dimethylaminoprop - 1-enylidene) - 3 - trifluoromethyl - 5H - dibenzo[a,d] cycloheptene or a pharmaceutically acceptable salt thereof.

24. The compound of Claim 17 wherein said compound is 10,11 - dihydro - 5 - (3 - dimethylaminoprop-1 - enylidene) - 3 - dimethylsulfamoyl - 5H - dibenzo[a,d]cycloheptene or a pharmaceutically acceptable salt thereof.

25. The compound of Claim 17 wherein said compound is 10,11 - dihydro - 5 - (3 - [N'-(β-hydroxyethyl)N-piperazino]prop - 1 - enylidene) - 3 - trifluoromethyl-5H - dibenzo[a,d]cycloheptene or a pharmaceutically acceptable salt thereof.

26. The compound of Claim 17 wherein said compound is 3 - cyano - 10,11 - dihydro - 5 - (3 - [N'-methyl-N-piperazino]prop - 1 - enylidene) - 5H - dibenzo[a,d]cycloneptene or a pharmaceutically acceptable salt thereof.

27. The compound of Claim 17 wherein said compound is 3 - chloro - 10,11 - dihydro - 5 - (3 - dimethylaminoprop - 1 - enylidene) - 5H - dibenzo[a,d]cycloheptene or a pharmaceutically acceptable salt thereof.

28. The process of Claim 34 wherein said process is conducted in a homogeneous system.

29. The process of Claim 28 wherein said base is selected from the group of alkali metal hydroxides; alkali metal (lower) alkoxides; and tetra(lower)alkyl ammonium hydroxides.

30. The process of Claim 28 wherein said inert organic solvent is selected from the group of alkyl alcohols, ethers, chlorinated hydrocarbons, and mixtures thereof.

31. The process of Claim 34 wherein said process is conducted in a heterogeneous solid-liquid system.

32. The process of Claim 31 wherein said base is a solid base selected from the group consisting of activated alumina and basic ion exchange resins.

33. The process of Claim 32 wherein said solvent is selected from the group consisting of dialkyl ethers, diaryl ethers, aralkyl ethers, cyclic ethers, and mixtures thereof.

34. A method for preparing the compounds of Claim 1 which comprises treating a compound having the formula:

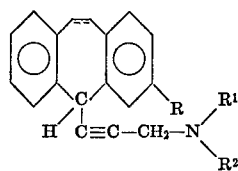

wherein R, R¹, R² and the dotted bond line are as defined in Claim 1;

with a base in an inert organic solvent under reactive conditions.

References Cited
UNITED STATES PATENTS

| | | |
|---|---|---|
| 3,126,411 | 3/1964 | Rey-Bellet et al. _ 260—240 TC X |
| 3,256,332 | 6/1966 | Lassen _____ 260—570.8 TC |
| 3,723,420 | 3/1973 | Dvolaitzky _____ 260—240 TC |

FOREIGN PATENTS

| | | |
|---|---|---|
| 1,017,696 | 1/1966 | England _____ 260—570.8 TC |

OTHER REFERENCES

Hennion et al.: J. Am. Chem. Soc., vol. 77, pp. 3253 to 3258 (1955).

JOHN D. RANDOLPH, Primary Examiner

U.S. Cl. X.R.

260—349.9, 457, 465 E, 570.8 TC, 592, 611 F, 618 F, 999